US 11,101,985 B2

United States Patent
Sun et al.

(10) Patent No.: US 11,101,985 B2
(45) Date of Patent: Aug. 24, 2021

(54) KEY TRANSFER METHOD AND SYSTEM BASED ON SHARED SECURITY APPLICATION, STORAGE MEDIUM, AND DEVICE THEREOF

(71) Applicant: Advanced New Technologies Co., Ltd., Grand Cayman (KY)

(72) Inventors: Xi Sun, Hangzhou (CN); Hongwei Luo, Hangzhou (CN)

(73) Assignee: ADVANCED NEW TECHNOLOGIES CO., LTD., Grand (KY)

(*) Notice: Subject to any disclaimer, the term of this patent is extended or adjusted under 35 U.S.C. 154(b) by 0 days.

(21) Appl. No.: 17/158,719

(22) Filed: Jan. 26, 2021

(65) Prior Publication Data

US 2021/0152339 A1 May 20, 2021

Related U.S. Application Data

(63) Continuation of application No. PCT/CN2019/096852, filed on Jul. 19, 2019.

(30) Foreign Application Priority Data

Oct. 12, 2018 (CN) .......................... 201811187142.8

(51) Int. Cl.
*H04L 29/06* (2006.01)
*G06F 21/00* (2013.01)
(Continued)

(52) U.S. Cl.
CPC .............. *H04L 9/083* (2013.01); *H04L 9/085* (2013.01); *H04L 9/0825* (2013.01); *H04L 9/0894* (2013.01); *H04L 9/3073* (2013.01)

(58) Field of Classification Search
CPC ....... H04L 9/083; H04L 9/3073; H04L 9/085; H04L 9/0825; H04L 9/0894
See application file for complete search history.

(56) References Cited

U.S. PATENT DOCUMENTS 5,288,978 A * 2/1994 Iijima ................... G07F 7/1008
235/380
10,686,769 B2 * 6/2020 Kashyap ............... H04L 9/3231
(Continued)

FOREIGN PATENT DOCUMENTS

CN 106326966 * 1/2017

*Primary Examiner* — Lisa C Lewis
(74) *Attorney, Agent, or Firm* — Shun Yao; Park, Vaughan, Fleming & Dowler LLP.

(57) ABSTRACT

One embodiment provides a key transfer system and method based on a shared security application. During operation, an application executing on a terminal device receives an application key comprising at least a service key from a management server of the application and forwards the application key to a management server of a shared security application residing in a secure element in the terminal device, thereby facilitating the management server of the shared security application to deliver the application key to the shared security application. The application invokes the application key stored in the shared security application to perform services associated with the application. The application key is isolated from other application keys associated with other applications stored in the shared security application.

24 Claims, 13 Drawing Sheets

(51) Int. Cl.
*H04L 9/08* (2006.01)
*H04L 9/30* (2006.01)

(56) References Cited

U.S. PATENT DOCUMENTS

| | | | | |
|---|---|---|---|---|
| 2004/0260925 | A1* | 12/2004 | Barnabo | H04L 63/083 |
| | | | | 713/168 |
| 2006/0113385 | A1* | 6/2006 | Chan | G06K 7/0004 |
| | | | | 235/440 |
| 2007/0040021 | A1* | 2/2007 | Nakayma | G06F 12/1408 |
| | | | | 235/380 |
| 2011/0219427 | A1* | 9/2011 | Hito | H04L 63/18 |
| | | | | 726/3 |
| 2015/0270963 | A1* | 9/2015 | Tanizawa | H04L 67/10 |
| | | | | 713/171 |
| 2018/0157433 | A1* | 6/2018 | Sajja | H04L 63/0442 |
| 2019/0205573 | A1* | 7/2019 | Couillard | H04L 9/321 |
| 2019/0312722 | A1* | 10/2019 | Brannon | H04L 9/3268 |

* cited by examiner

A management server of a mobile application generates an application key applied to the mobile application in an execution environment in a mobile terminal, wherein the application key includes a service key, and the management server of the mobile application delivers the application key to the mobile terminal;

a management server of a shared security application receives the application key and delivers the application key to the shared security application in a secure element in the mobile terminal;

the shared security application stores application keys of several mobile applications for responding to invocation of service operations of the respective mobile applications

S1

The mobile application in the execution environment in the mobile terminal invokes a corresponding communication security protection key of the mobile application in the shared security application through an interface provided by a shared security application proxy in the execution environment in the mobile terminal to firstly decrypt service data, then performs service processing using a service key, and returns a service processing result to the corresponding mobile application

KEY TRANSFER METHOD AND SYSTEM BASED ON SHARED SECURITY APPLICATION, STORAGE MEDIUM, AND DEVICE THEREOF

RELATED APPLICATION

Under 35 U.S.C. § 120 and § 365(c), this application is a continuation of PCT Application No. PCT/CN2019/096852, entitled "KEY TRANSFER METHOD AND SYSTEM BASED ON SHARED SECURITY APPLICATION, STORAGE MEDIUM, AND DEVICE THEREOF," by inventors Xi Sun and Hongwei Luo, filed 19 Jul. 2019, which claims priority to Chinese Patent Application No. 201811187142.8, filed on 12 Oct. 2018.

TECHNICAL FIELD

One or a plurality of embodiments of the present specification relate to the field of key communication of a mobile terminal, and in particular, to a key transfer method and system based on a shared security application, a storage medium, and a device thereof.

BACKGROUND

As mobile intelligent terminals become more and more powerful and have increasingly improved processing performance, secure elements have been more and more integrated in mobile intelligent terminals and applied to more and more service scenarios having high security requirements. In conventional mobile applications using a secure element for secure computing, for each mobile application, a corresponding independent security application needs to be installed in the secure element, and the independent security application is responsible for accomplishing secure computing requirements of the mobile application.

For some mobile applications, especially for those having unified requirements for secure computing, for example, when corresponding service keys are mainly used to perform encryption and decryption operations or a signing operation, if the conventional approach of separately installing corresponding security applications is used, high development costs and promotion costs will be caused. A faster or more reliable solution needs to be provided to implement key transfer based on a shared security application.

SUMMARY

In view of at least one of the aforementioned technical problems, one or a plurality of embodiments of the present specification provide a key transfer method and system based on a shared security application, an electronic device, and a storage medium, wherein a lightweight secure computing solution based on a secure element is employed, so that background docking costs can be avoided when service keys of different applications are securely downloaded to a shared security application; meanwhile, communication security protection keys are combined with service keys, so that flow processing on the service level can be implemented through the service keys while secure communication between mobile applications and the shared security application can be implemented through the communication security protection keys.

One embodiment provides a key transfer system and method based on a shared security application. During operation, an application executing on a terminal device receives an application key comprising at least a service key from a management server of the application and forwards the application key to a management server of a shared security application residing in a secure element in the terminal device, thereby facilitating the management server of the shared security application to deliver the application key to the shared security application. The application invokes the application key stored in the shared security application to perform services associated with the application. The application key is isolated from other application keys associated with other applications stored in the shared security application.

In a variation on this embodiment, the application key further comprises a communication security protection key. The application encrypts service data associated with the services using the communication security protection key and sends the encrypted service data to the shared security application.

In a further variation, the shared security application decrypts the encrypted service data, processes the service data using the service key, encrypts the processed service data using the communication security protection key, and returns the encrypted processed service data to the application.

In a variation on this embodiment, receiving the application key from the management server of the application comprises receiving the application key that is encrypted by the management server of the application using a public key of the management server of the shared security application. The public key of the management server of the shared security application is distributed to the management server of the application by the management server of the shared security application.

In a further variation, forwarding the application key comprises: invoking a corresponding interface provided by a shared security application proxy on the terminal device external of the secure element; sending, by the application via the corresponding interface and the security application proxy, the encrypted application key to the management server of the shared security application; performing, by the management server of the shared security application, decryption using a private key corresponding to the public key to obtain the application key; and delivering, by the management server of the shared security application, the application key to the shared security application in the secure element.

In a further variation, the shared security application proxy is executed in a rich execution environment or a trusted execution environment of the terminal device.

In a further variation, the public key and the private key of the management server of the shared security application form an asymmetric key pair, and an encryption or decryption operation based on the asymmetric key pair comprises one of the following operations: Rivest-Shamir-Adleman (RSA), Elgamal, knapsack, Rabin, Diffie-Hellman (D-H), and elliptic-curve cryptography (ECC).

In a variation on this embodiment, the application is executed in a rich execution environment or a trusted execution environment of the terminal device.

In order to achieve the aforementioned objective, one or a plurality of embodiments of the present specification provide a key transfer method based on a shared security application, comprising the following steps:

S1, generating, by a management server of a mobile application, an application key applied to the mobile application in an execution environment in a mobile terminal, wherein the application key comprises a service key, and delivering, by the management server of the mobile application, the application key to the mobile terminal; and receiving, by a management server of a shared security application, the application key and delivering the application key to the shared security application in a secure element in the mobile terminal, wherein the shared security application stores application keys of several mobile applications for responding to invocation of service operations of the respective mobile applications.

Preferably, the application key comprises a communication security protection key, the management server of the mobile application delivers the communication security protection key to the mobile terminal, and the mobile application in the execution environment in the mobile terminal stores the communication security protection key.

Preferably, the execution environment in the mobile terminal is configured with a shared security application proxy, the shared security application proxy provides an interface between the mobile application in the mobile terminal and the corresponding application key in the shared security application, and the service key is delivered to the shared security application in the secure element in the mobile terminal by the management server of the shared security application and the shared security application proxy in the execution environment in the mobile terminal.

Further, the generation of the application key specifically comprises the following substeps:

S11, distributing, by a management server of a shared security application, a public key thereof to several management servers of mobile applications;

S12, generating, by the several management servers of the mobile applications, respective application keys for several corresponding mobile applications, wherein the application keys comprise communication security protection keys and service keys; and S13, encrypting, by the several management servers of the mobile applications, application keys to be written to the shared security application using the public key of the management server of the shared security application, and delivering the encrypted application keys to corresponding mobile applications in the mobile terminal.

Further, delivering the application key to a shared security application in a secure element in the mobile terminal specifically comprises the following steps:

S15, invoking, by several mobile applications, corresponding interfaces provided by the shared security application proxy in the mobile terminal, to import respective application keys encrypted and protected using the public key of the management server of the shared security application;

S16, sending, by the shared security application proxy, the imported encrypted application keys of the several mobile applications to the management server of the shared security application;

S17, performing, by the management server of the shared security application, decryption using a private key thereof to obtain application keys of the several mobile applications to be written to the shared security application; and S18, delivering, by the management server of the shared security application, the application keys of the several mobile applications to the shared security application in the secure element of the mobile terminal.

Further, the shared security application securely stores the application keys of the several mobile applications, and application keys of different mobile applications are isolated from each other.

Preferably, the mobile applications are placed in a rich execution environment and/or a trusted execution environment of the mobile terminal.

Preferably, the shared security application proxy is placed in a rich execution environment and/or a trusted execution environment of the mobile terminal.

Preferably, the public key and the private key of the management server of the shared security application are an asymmetric key pair.

A key transfer method based on a shared security application, comprises the following steps:

S2: invoking, by a mobile application in an execution environment in a mobile terminal, a corresponding communication security protection key of the mobile application in a shared security application through an interface provided by a shared security application proxy in the execution environment in the mobile terminal to first decrypt service data, then performing service processing using a service key, and returning a service processing result to the corresponding mobile application.

Further, step S2 comprises the following substeps:

S21, initiating, by the mobile application, a service operation request, and encrypting, by the mobile application using the communication protection key, service data to be processed using the service key;

S22, sending, by the mobile application, the encrypted service data to the shared security application by invoking the interface provided by the shared security application proxy; and S23, decrypting, by the shared security application, the service data using the communication security protection key of the corresponding mobile application, then performing processing using the service key, and returning a processing result to the mobile application.

Preferably, the mobile applications are placed in a rich execution environment and/or a trusted execution environment of the mobile terminal.

Preferably, the shared security application proxy is placed in a rich execution environment and/or a trusted execution environment of the mobile terminal.

A key transfer system based on a shared security application comprises a shared security application built in a secure element of a mobile terminal, several mobile applications and a shared security application proxy built in an execution environment of the mobile terminal, and management servers of the mobile applications, wherein the management servers of the mobile applications are configured to generate respective application keys for several corresponding mobile applications, wherein the application keys comprise service keys;

the shared security application securely stores the several application keys, and the shared security application proxy provides interfaces between the several mobile applications and the corresponding application keys in the shared security application; and the mobile applications invoke the corresponding service keys in the shared security application through the interfaces provided by the shared security application proxy to perform service processing, and return service processing results to the corresponding mobile applications. The key transfer system based on a shared security application improves the security level of a service product of a mobile terminal, and can be applied to, for example, scenarios such as intelligent door lock services and two-dimensional code anti-counterfeiting.

Preferably, the application keys further comprise communication security protection keys, the management servers of the mobile applications deliver the communication security protection keys to the mobile terminal, and the mobile applications in the execution environment in the mobile terminal store the communication security protection keys.

Preferably, the key transfer system based on a shared security application further comprises a management server of the shared security application, wherein the management server of the shared security application is configured to distribute a public key thereof to the several management servers of the mobile applications; the several management servers of the mobile applications encrypt the application keys to be written to the shared security application using the public key of the management server of the shared security application and deliver the application keys to the corresponding mobile applications of the mobile terminal; the several mobile applications invoke the corresponding interfaces provided by the shared security application proxy to import the respective application keys encrypted and protected using the management server of the shared security application; the shared security application proxy sends the several imported encrypted application keys to the management server of the shared security application; the management server of the shared security application performs decryption using a private key of the management server of the shared security application to obtain the several application keys to be written to the shared security application; the management server of the shared security application delivers the several application keys to the shared security application; and the shared security application securely stores the several application keys, and the application keys of different mobile applications are isolated from each other.

Preferably, the mobile application initiates a service operation request, and the mobile application encrypts, using the communication protection key, service data to be processed using the service key; the mobile application sends the encrypted service data to the shared security application by invoking the interface provided by the shared security application proxy; and the shared security application decrypts the service data using the corresponding communication security protection key, then processes the decrypted service data using the service key, and returns a processing result to the mobile application.

Preferably, the mobile application is placed in a rich execution environment and/or a trusted execution environment of the mobile terminal.

Preferably, the shared security application proxy is placed in a rich execution environment and/or a trusted execution environment of the mobile terminal.

Preferably, the public key and the private key of the management server of the shared security application are an asymmetric key pair, and an encryption algorithm of the asymmetric key pair comprises any one of RSA, Elgamal, a knapsack algorithm, Rabin, D-H, and ECC.

An electronic device comprises a memory, a processor, and a computer program stored on the memory and executable by the processor, wherein the processor, when executing the program, implements the key transfer method based on a shared security application described above.

A computer-readable storage medium comprises a computer program stored thereon, wherein the computer program, when executed by a processor, implements the key transfer method based on a shared security application described above.

As compared with the current technologies, one or a plurality of embodiments of the present specification have the following advantages:

one or a plurality of embodiments of the present specification provide a key transfer method based on a shared security application, wherein a shared security application placed in a secure element stores application keys invoked by a plurality of mobile applications, and meanwhile, the shared security application provides security isolation protection for an independent and dedicated application key of each mobile application. The one or plurality of embodiments of the present specification further relate to a key transfer system based on a shared security application, an electronic device, and a storage medium. The one or plurality of embodiments of the present specification provide a novel security application solution architecture, especially for mobile applications having common secure computing requirements, by employing a lightweight secure computing solution based on a secure element, so that background docking costs can be avoided when service keys of different applications are securely downloaded to a shared security application; meanwhile, communication security protection keys are combined with service keys, so that flow processing on the service level can be implemented through the service keys while secure communication between mobile applications and the shared security application can be implemented through the communication security protection keys. Especially for mobile applications that need to realize simple and universal secure computing requirements through a secure element, it is unnecessary to independently develop an application software development kit and download, install, and personalize the kit to the secure element, thereby greatly reducing the costs of secure computing performed by the mobile applications using the secure element.

The above description is merely an overview of technical solutions in the one or plurality of embodiments of the present specification. In order to understand the technical means in the one or plurality of embodiments of the present specification more clearly and implement the technical means according to the content of the specification, preferred embodiments of the one or plurality of embodiments of the present specification are described in detail below with reference to the accompanying drawings. The specific implementation of the one or plurality of embodiments of the present specification is provided in detail by the following embodiments and accompanying drawings thereof.

BRIEF DESCRIPTION OF THE DRAWINGS

Further detailed description is provided below with reference to the accompanying drawings and the implementation of one or a plurality of embodiments of the present specification.

FIG. 1 is a flowchart of a key transfer method based on a shared security application in one or a plurality of embodiments of the present specification.

DETAILED DESCRIPTION

Figure 2:
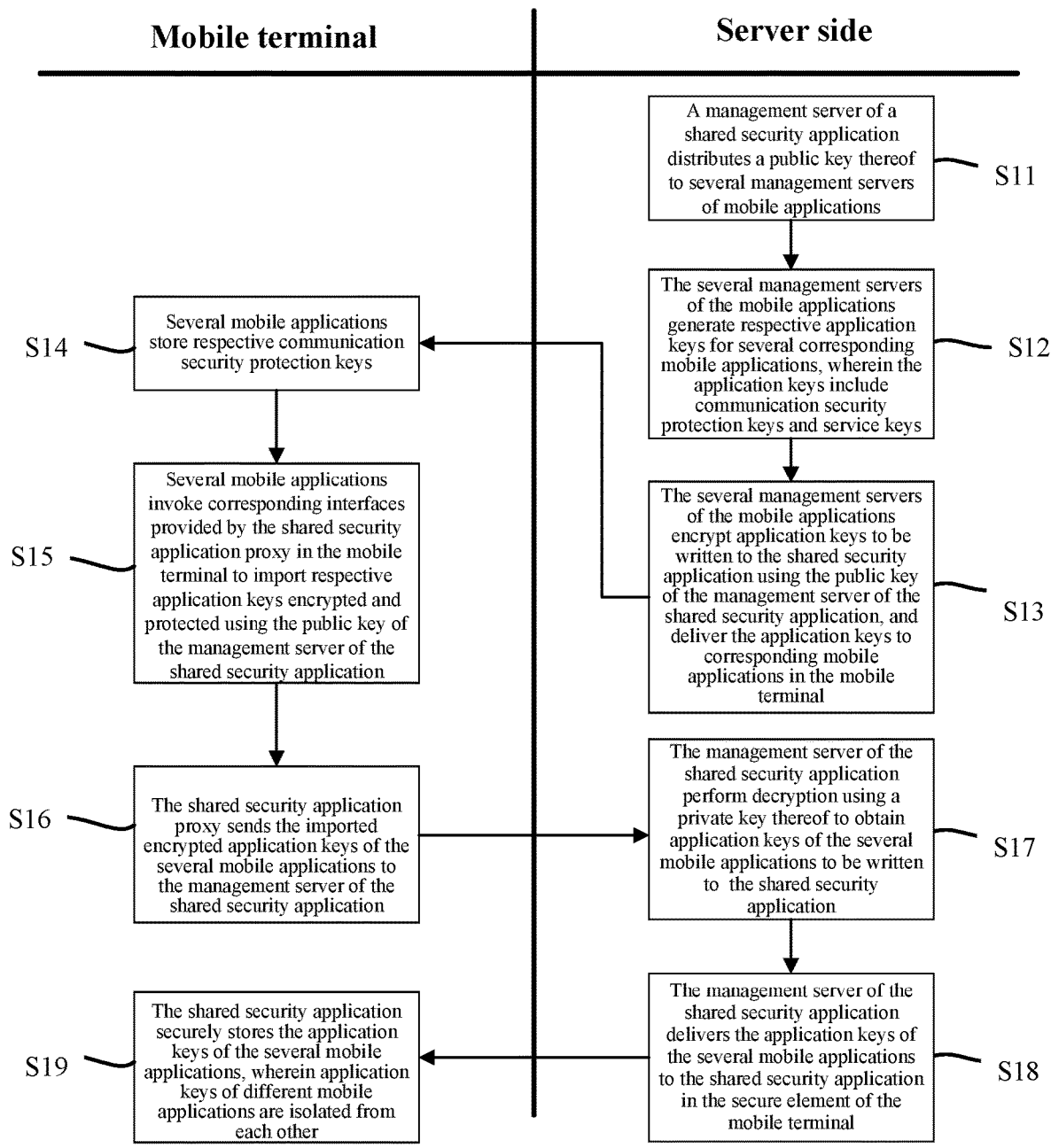
FIG. 2 is a flowchart illustrating substeps of step S1 in the key transfer method based on a shared security application in one or a plurality of embodiments of the present specification.

In order to make the objectives, technical solutions and advantages of one or a plurality of embodiments of the present specification clearer, the one or plurality of embodiments of the present specification are further described in detail below with reference to the accompanying drawings and embodiments. It should be understood that the specific embodiments described here are merely used for explaining one or a plurality of embodiments of the present specification, not for limiting the one or plurality of embodiments of the present specification.

As shown in FIG. 1, a key transfer method based on a shared security application includes the following steps:

S1, a management server of a mobile application generates an application key applied to a mobile application in an execution environment in a mobile terminal, wherein the application key includes a service key, and the management server of the mobile application delivers the application key to the mobile terminal; and the management server of the shared security application receives the application key and delivers the application key to a shared security application in a secure element in the mobile terminal; wherein the shared security application stores application keys of several mobile applications for responding to invocation of service operations of the respective mobile applications.

In one embodiment or a plurality of embodiments (not shown in the drawing), a service key may be generated by a management server of a mobile application and then directly delivered back to a management server of a shared security application, and delivered to the shared security application in a secure element in a mobile terminal through the management server of the shared security application, and application keys of several mobile applications are stored in the shared security application for invocation by service operations. Compared with the conventional security application authentication, background (server side) docking costs can be avoided when service keys of different third-party applications are securely downloaded to a shared security application, and a lightweight secure computing solution based on a secure element is provided for mobile applications having common secure computing requirements.

In one embodiment or a plurality of embodiments, the application key further includes a communication security protection key, the management server of the mobile application delivers the communication security protection key to the mobile terminal, and the mobile application in the execution environment in the mobile terminal stores the communication security protection key. The communication security protection key is used for protecting a communication process of the mobile application, preventing it from being stolen; the service key is used for protecting a service delivery and execution process of each mobile application after initiation of a service request, preventing it from being stolen.

In one embodiment or a plurality of embodiments, the execution environment in the mobile terminal is configured with a shared security application proxy, the shared security application proxy provides an interface between the mobile application in the mobile terminal and the corresponding application key in the shared security application, and the service key is delivered to the shared security application in the secure element in the mobile terminal through the management server of the shared security application and the shared security application proxy in the execution environment in the mobile terminal. It should be understood that step S1 may exist independently; that is, step S1 may be implemented as a delivery configuration phase of an application key in one embodiment or a plurality of embodiments. An existing management server of a mobile application generates a corresponding application key and all application keys are deployed in a shared security application, wherein application keys of different mobile applications are stored while being isolated from each other in the shared security application to prepare for subsequent response to service requests of mobile applications. It should be further understood that the application keys include communication security protection keys and/or service keys, the communication security protection keys are used for protecting communication processes of the mobile applications, preventing it from being stolen; the service keys are used for protecting service delivery and execution processes of the mobile applications after initiation of service requests, preventing it from being stolen. In one embodiment or a plurality of embodiments, compared with the conventional security application authentication, background (server side) docking costs can be avoided when service keys of different third-party applications are securely downloaded to a shared security application, and a lightweight secure computing solution based on a secure element is provided for mobile applications having common secure computing requirements.

Specifically, in one embodiment or a plurality of embodiments, when the application key includes only the communication security protection key, the application key implements secure communication between mobile application and the shared security application through only the communication security protection key; in one embodiment or a plurality of embodiments, when the application key includes only the service key, the application key implements protection of flow processing on the service level through only the service key; in one embodiment or a plurality of embodiments, when the application key includes both the communication security protection key and the service key, the application key implements secure communication between mobile application And the shared security application through the communication security protection key, and implements protection of flow processing on the service level through the service key.

As shown in FIG. 2, step S1 includes the following substeps:

S11, the management server of a shared security application distributes a public key thereof to several management servers of mobile applications;

S12, the several management servers of the mobile applications generate respective application keys for several corresponding mobile applications, wherein the application keys include communication security protection keys and service keys;

S13, the several management servers of the mobile applications encrypt application keys to be written to the shared security application using the public key of the management server of the shared security application, and deliver the application keys to corresponding mobile applications in the mobile terminal;

S14, several mobile applications store respective communication security protection keys;

S15, several mobile applications invoke corresponding interfaces provided by the shared security application proxy in the mobile terminal to import respective application keys encrypted and protected using the public key of the management server of the shared security application;

S16, the shared security application proxy sends the imported encrypted application keys of the several mobile applications to the management server of the shared security application;

S17, the management server of the shared security application performs decryption using a private key thereof to obtain application keys of the several mobile applications to be written to the shared security application;

S18, the management server of the shared security application delivers the application keys of the several mobile applications to the shared security application in the secure element of the mobile terminal; and S19, the shared security application securely stores the application keys of the several mobile applications, wherein application keys of different mobile applications are isolated from each other.

As shown in FIG. 1, the key transfer method based on a shared security application further includes step S2: a mobile application in an execution environment in a mobile terminal invokes a corresponding communication security protection key of the mobile application in a shared security application through an interface provided by a shared security application proxy in the execution environment in the mobile terminal to first decrypt service data, then performs service processing using a service key, and returns a service processing result to the corresponding mobile application. It should be understood that step S2 is implemented in one or a plurality of embodiments as that a shared security application in a mobile terminal responds to a service request of a mobile application and processes the service request by using an application key in the shared security application.

Figure 3:
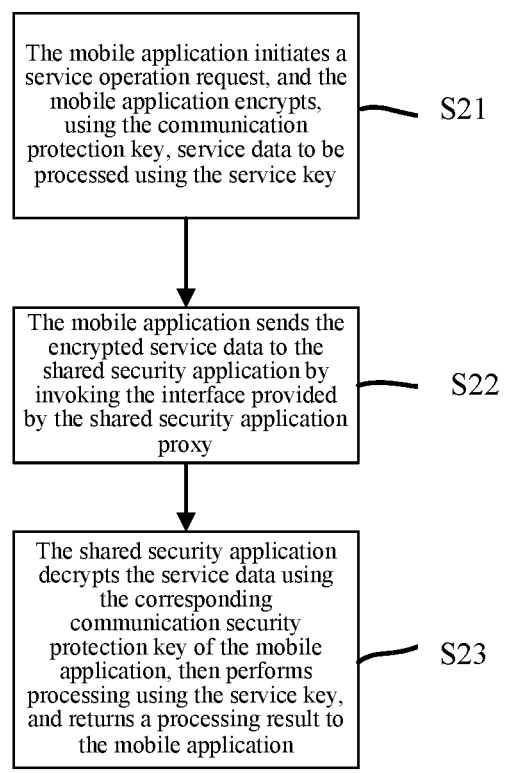
FIG. 3 is a flowchart illustrating substeps of step S2 in the key transfer method based on a shared security application in one or a plurality of embodiments of the present specification.

As shown in FIG. 3, step S2 includes the following substeps:

S21, the mobile application initiates a service operation request, and the mobile application encrypts, using the communication protection key, service data to be processed using the service key;

S22, the mobile application sends the encrypted service data to the shared security application by invoking the interface provided by the shared security application proxy; and S23, the shared security application decrypts the service data using the communication security protection key of the corresponding mobile application, then performs processing using the service key, and returns a processing result to the mobile application to be used to complete the subsequent service flow.

In one embodiment or a plurality of embodiments, communication security protection keys may be configured as symmetric keys; for example, an encryption algorithm including, but not limited to, any one of DES, 3DES, IDEA, FEAL, and BLOWFISH is employed to configure the communication security protection keys as symmetric keys. In this application scenario, communication security protection keys of several mobile applications in the shared security application may be configured as the same key or different keys. Similarly, the communication security protection keys may also be configured as asymmetric keys; for example, an encryption algorithm of asymmetric keys including, but not limited to, any one of RSA, Elgamal, a knapsack algorithm, Rabin, D-H, and ECC is employed to configure communication security protection keys in mobile applications in the mobile terminal as public keys for encryption and encapsulation, and configure communication security protection keys in the shared security application as private keys for decryption. In this application scenario, communication security protection keys of several mobile applications in the shared security application are configured as different keys.

In one embodiment or a plurality of embodiments, service keys may be configured as symmetric keys; for example, an encryption algorithm including, but not limited to, any one of DES, 3DES, IDEA, FEAL, and BLOWFISH is employed to configure the service keys as symmetric keys. In this application scenario, service keys of several mobile applications in the shared security application may be configured as the same key or different keys. Similarly, the service keys may also be configured as asymmetric keys; for example, an encryption algorithm of asymmetric keys including, but not limited to any one of RSA, Elgamal, a knapsack algorithm, Rabin, D-H, and ECC is employed to configure the service keys in the shared security application as public keys for processing and encapsulation. In this application scenario, service keys of several mobile applications in the shared security application are configured as different keys.

Figure 4:
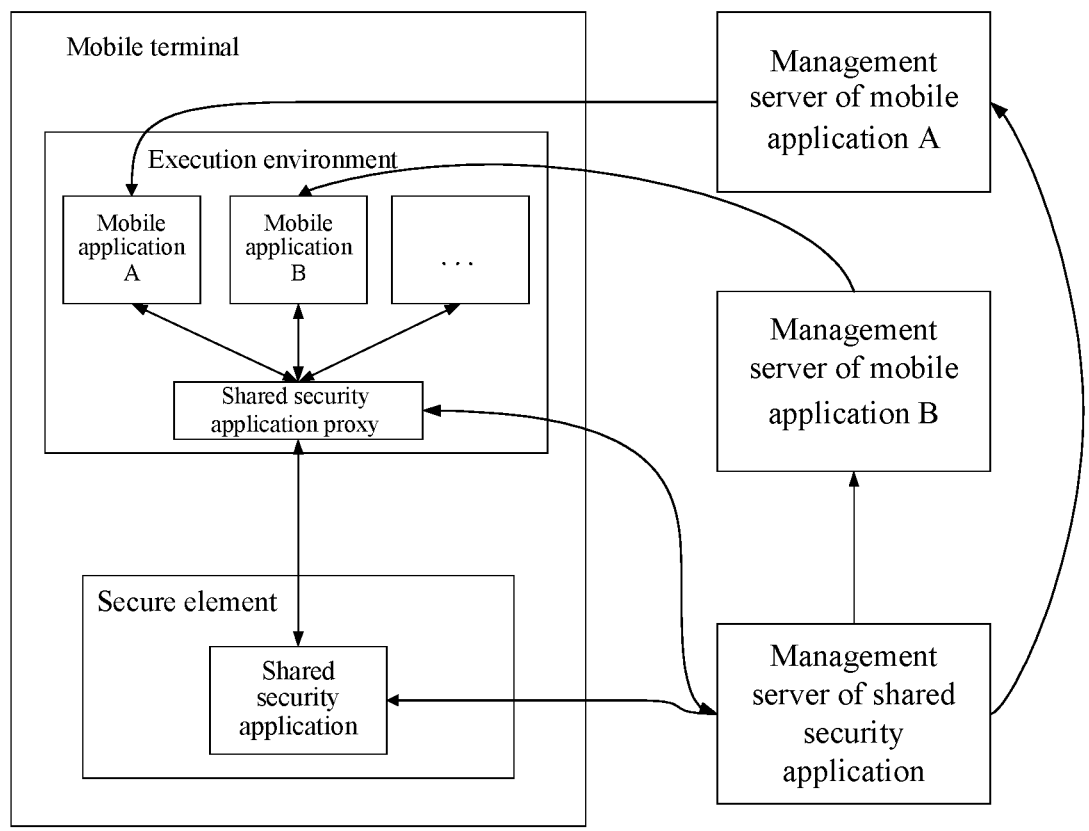
FIG. 4 is a schematic diagram of a key transfer system based on a shared security application in one or a plurality of embodiments of the present specification.

As shown in FIG. 4, a key transfer system based on a shared security application includes a shared security application built in a secure element of a mobile terminal, several mobile applications (for example, a mobile application A and a mobile application B) and a shared security application proxy built in an execution environment of the mobile terminal, and management servers of the mobile applications (for example, a management server of mobile application A and a management server of mobile application B). The management servers of the mobile applications are configured to generate respective application keys for several corresponding mobile applications, wherein the application keys include communication security protection keys and service keys. The mobile applications in the execution environment in the mobile terminal store the communication security protection keys. The shared security application securely stores the several application keys (for example, an application key of mobile application A and an application key of mobile application B), and the shared security application proxy provides interfaces between the several mobile applications and the corresponding application keys in the shared security application (for example, the shared security application proxy provides an interface between mobile application A and the application key of mobile application A in the shared security application, and the shared security application proxy provides an interface between mobile application B and the application key of mobile application B in the shared security application). The mobile applications invoke the corresponding communication security protection keys in the shared security application through the interfaces provided by the shared security application proxy to first decrypt service data, and then perform service processing using the service keys, and return service processing results to the corresponding mobile applications to be used to complete the subsequent service flow. The secure element can provide a more secure data storage and computing environment. The shared security application is located in the secure element, allows a mobile application to download an application key (including a communication security protection key and a service key) thereof, and provides a standard secure computing function for the mobile application. The shared security application proxy is responsible for providing an access interface for the mobile application, and implements life cycle management, for example, operations such as download, installation, use, and deletion, on the service key of the mobile application in the shared application. It should be understood that in this implementation, when the application key includes only the service key, the application key is applied to scenarios having no requirement on communication security or being protected using other communication security protection mechanisms.

Preferably, as shown in FIG. 4, the key transfer system based on a shared security application further includes a management server of the shared security application, wherein the management server of the shared security application is configured to distribute a public key thereof to the several management servers of the mobile applications; the several management servers of the mobile applications encrypt the application keys to be written to the shared security application using the public key of the management server of the shared security application and deliver the application keys to the corresponding mobile applications of the mobile terminal; the several mobile applications invoke the corresponding interfaces provided by the shared security application proxy to import the respective application keys encrypted and protected using the management server of the shared security application; the shared security application proxy sends the several imported encrypted application keys to the management server of the shared security application; the management server of the shared security application performs decryption using a private key of the management server of the shared security application to obtain the several application keys to be written to the shared security application; the management server of the shared security application delivers the several application keys to the shared security application; and the shared security application securely stores the several application keys, and the application keys of different mobile applications are isolated from each other.

Preferably, the mobile application initiates a service operation request, and the mobile application encrypts, using the communication protection key, service data to be processed using the service key; the mobile application sends the encrypted service data to the shared security application by invoking the interface provided by the shared security application proxy; and the shared security application decrypts the service data using the corresponding communication security protection key, then processes the decrypted service data using the service key, and returns a processing result to the mobile application.

Preferably, the execution environment of the mobile terminal is a set of software and hardware existing in a mobile device, which can provide necessary capability support for execution of applications in the mobile device, and generally includes components such as a hardware processing unit, a volatile storage unit, a non-volatile storage unit, an operating system, an invocation interface, etc. Generally, the execution environment includes a rich execution environment and a trusted execution environment. The rich execution environment is an open execution environment running in the mobile device, which provides open and rich running capability support for the execution of applications therein, but has relatively weak security protection capability. The trusted execution environment is an isolated execution environment running in the mobile device, which has stronger security capability than the rich execution environment to ensure that applications, sensitive data, and so on running therein are stored, processed, and protected in a relatively trusted environment. The mobile applications are placed in the rich execution environment and/or the trusted execution environment of the mobile terminal. The shared security application proxy is placed in the rich execution environment and/or the trusted execution environment of the mobile terminal. In this embodiment, a key pair (a public key and a private key) of the management server of the shared security application is configured as asymmetric keys. For example, an encryption algorithm of asymmetric keys including, but not limited to, any one of RSA, Elgamal, a knapsack algorithm, Rabin, D-H, and ECC is employed to configure the key pair of the management server of the shared security application as a public key and a private key for encapsulation of encryption or decryption.

The situation that the mobile applications are placed in the rich execution environment and/or the trusted execution environment of the mobile terminal, and the situation that the shared security application proxy is placed in the rich execution environment and/or the trusted execution environment of the mobile terminal are respectively described below through Embodiments 1 to 7 with reference to FIG. 5 to FIG. 11. It should be understood that in Embodiments 1 to 7, the application key is configured as a communication security protection key and a service key, and the application key implements secure communication between mobile application And the shared security application through the communication security protection key and implements protection of flow processing on the service level through the service key.

Embodiment 1

Figure 5:
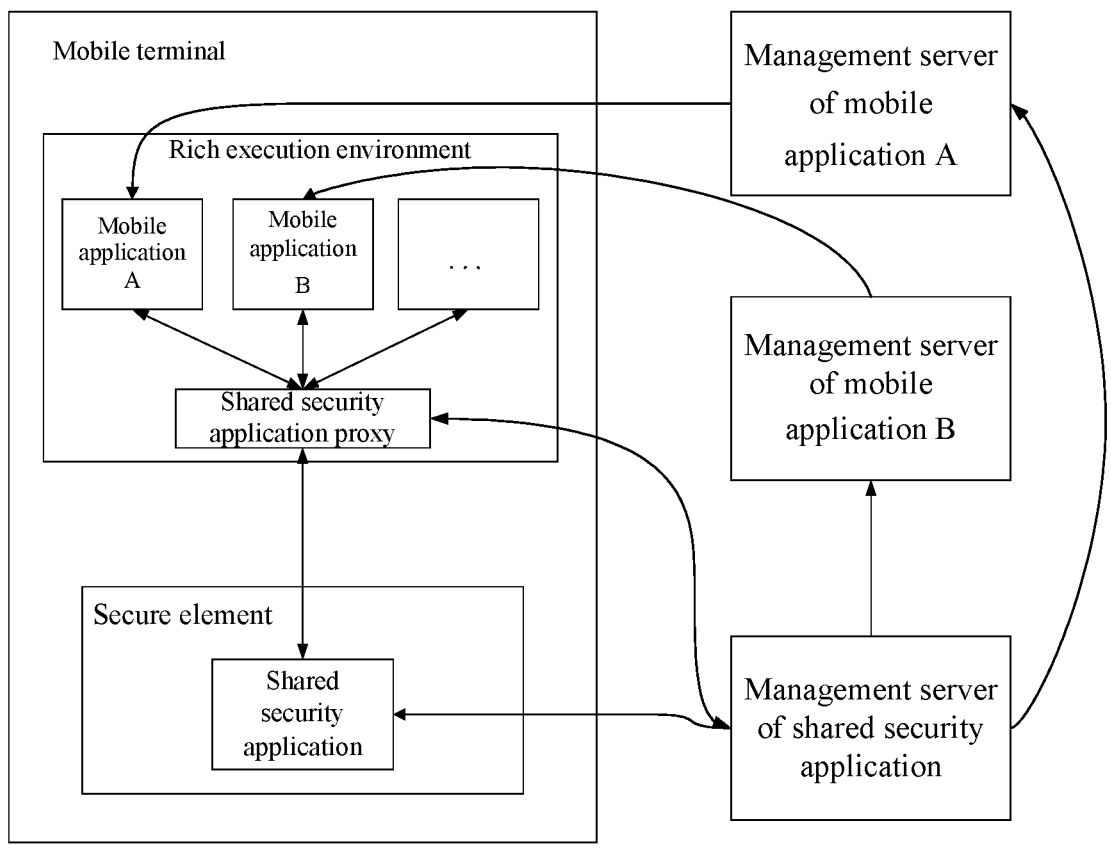
FIG. 5 is a schematic diagram of the key transfer system based on a shared security application in Embodiment 1 of the present specification.

As shown in FIG. 5, the management server of the shared security application distributes a public key thereof to the management server of mobile application A and the management server of mobile application B; the management server of mobile application A generates an application key of mobile application A, the management server of mobile application B generates an application key of mobile application B, and the application keys include communication security protection keys and service keys; the management server of mobile application A and the management server of mobile application B respectively encrypt application keys to be written to the shared security application using a public key of the management server of the shared security application, and deliver the application keys to corresponding mobile applications (for example, mobile application A and mobile application B) in the rich execution environment of the mobile terminal; the mobile applications (for example, mobile application A and mobile application B) store respective communication security protection keys; the mobile applications in the rich execution environment invoke corresponding interfaces provided by a shared security application proxy that is also in the rich execution environment to import respective application keys encrypted and protected using the management server of the shared security application; the shared security application proxy in the rich execution environment sends the imported encrypted application keys of the mobile applications (for example, the application key of mobile application A and the application key of mobile application B) to the management server of the shared security application; the management server of the shared security application performs decryption using a private key thereof to obtain the application keys of the mobile applications (for example, the application key of mobile application A and the application key of mobile application B) to be written to the shared security application; the management server of the shared security application delivers the application keys of the mobile applications (for example, the application key of mobile application A and the application key of mobile application B) to the shared security application in the secure element of the mobile terminal; the shared security application securely stores the application keys of the mobile applications (for example, the application key of mobile application A and the application key of mobile application B), wherein the application key of mobile application A and the application key of mobile application B are stored while being isolated from each other, waiting for responding to service requests of the mobile applications in the rich execution environment.

Mobile application A or mobile application B in the rich execution environment initiates a service operation request, and mobile application A or mobile application B encrypts, using the communication protection key, service data to be processed using the service key; mobile application A or mobile application B sends the encrypted service data to the shared security application by invoking the interface provided by the shared security application proxy in the rich execution environment; and the shared security application decrypts the service data using the communication security protection key of the corresponding mobile application, then performs processing using the service key, and returns a processing result to mobile application A or mobile application B in the rich execution environment, so as to be used to complete the service flow of mobile application A or mobile application B in the rich execution environment. Compared with the conventional security application authentication, background (server side) docking costs can be avoided when service keys of mobile applications in a rich execution environment are securely downloaded to a shared security application, and a lightweight secure computing solution based on a secure element is provided for mobile applications in the rich execution environment having common secure computing requirements.

Embodiment 2

Figure 6:
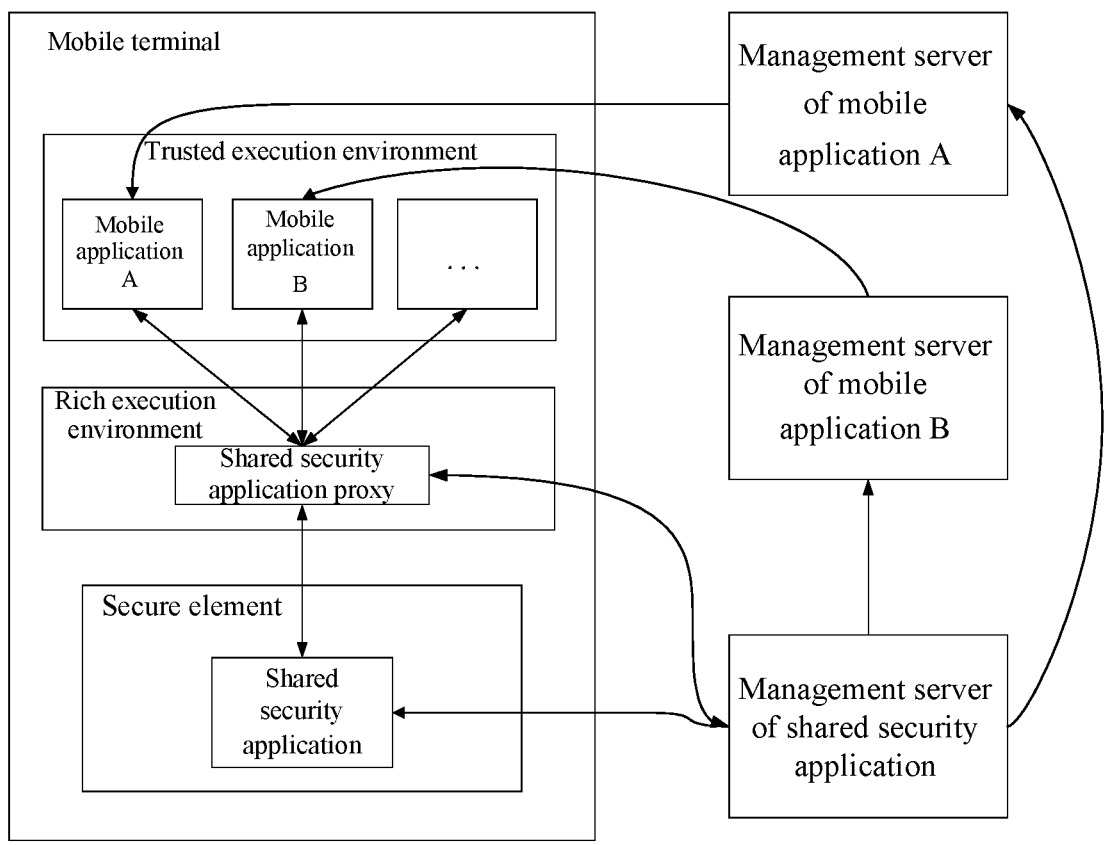
FIG. 6 is a schematic diagram of the key transfer system based on a shared security application in Embodiment 2 of the present specification.

As shown in FIG. 6, the management server of the shared security application distributes a public key thereof to the management server of mobile application A and the management server of mobile application B; the management server of mobile application A generates an application key of mobile application A, the management server of mobile application B generates an application key of mobile application B, and the application keys include communication security protection keys and service keys; the management server of mobile application A and the management server of mobile application B respectively encrypt application keys to be written to the shared security application using a public key of the management server of the shared security application, and deliver the application keys to the corresponding mobile applications (for example, mobile application A and mobile application B) in the trusted execution environment of the mobile terminal; the mobile applications (for example, mobile application A and mobile application B) in the trusted execution environment store respective communication security protection keys; the mobile applications (for example, mobile application A and mobile application B) in the trusted execution environment invoke corresponding interfaces provided by a shared security application proxy in the rich execution environment to import respective application keys encrypted and protected using the management server of the shared security application; the shared security application proxy in the rich execution environment sends the imported encrypted application keys (for example, the application key of mobile application A and the application key of mobile application B) to the management server of the shared security application; the management server of the shared security application performs decryption using a private key thereof to obtain the application keys of the mobile applications (for example, the application key of mobile application A and the application key of mobile application B) to be written to the shared security application; the management server of the shared security application delivers the application keys of the mobile applications (for example, the application key of mobile application A and the application key of mobile application B) to the shared security application in the secure element of the mobile terminal; the shared security application securely stores the application keys of the mobile applications (for example, the application key of mobile application A and the application key of mobile application B), wherein the application key of mobile application A and the application key of mobile application B are stored while being isolated from each other, waiting for responding to service requests of the mobile applications in the trusted execution environment.

Mobile application A or mobile application B in the trusted execution environment initiates a service operation request, and mobile application A or mobile application B encrypts, using the communication protection key, service data to be processed using the service key; mobile application A or mobile application B sends the encrypted service data to the shared security application by invoking the interface provided by the shared security application proxy in the rich execution environment; and the shared security application decrypts the service data using the communication security protection key of the corresponding mobile application, then performs processing using the service key, and returns a processing result to mobile application A or mobile application B in the trusted execution environment, so as to be used to complete the service flow of mobile application A or mobile application B in the trusted execution environment. Compared with the conventional security application authentication, background (server side) docking costs can be avoided when service keys of mobile applications in a trusted execution environment are securely downloaded to a shared security application, and a lightweight secure computing solution based on a secure element is provided for mobile applications in the trusted execution environment having common secure computing requirements.

Embodiment 3

Figure 7:
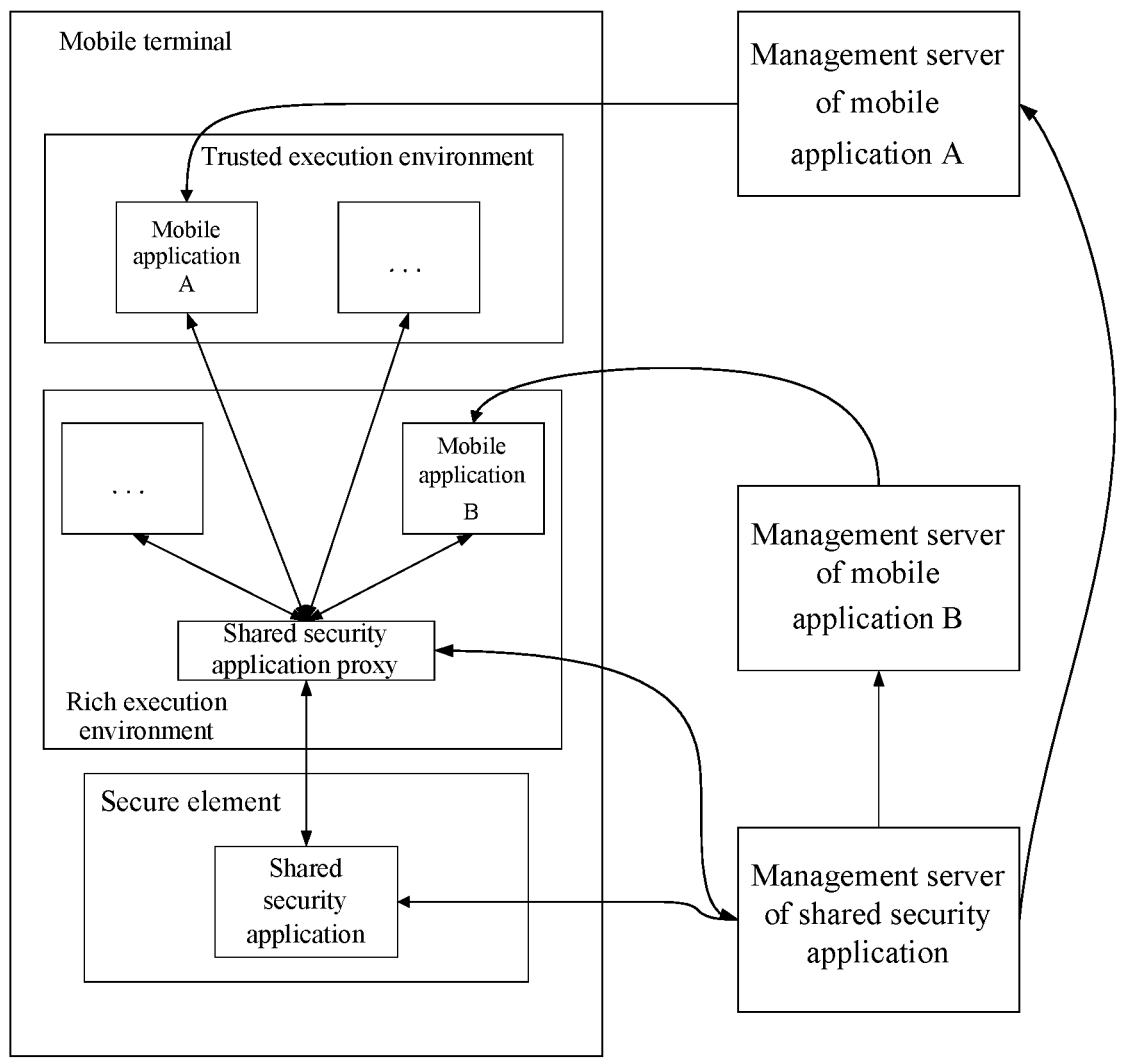
FIG. 7 is a schematic diagram of the key transfer system based on a shared security application in Embodiment 3 of the present specification.

As shown in FIG. 7, the management server of the shared security application distributes a public key thereof to the management server of mobile application A and the management server of mobile application B; the management server of mobile application A generates an application key of mobile application A, the management server of mobile application B generates an application key of mobile application B, and the application keys include communication security protection keys and service keys; the management server of mobile application A and the management server of mobile application B respectively encrypt application keys to be written to the shared security application using a public key of the management server of the shared security application, and deliver the application keys to mobile application A in the trusted execution environment of the mobile terminal and mobile application B in the rich execution environment; mobile application A in the trusted execution environment and mobile application B in the rich execution environment store respective communication security protection keys; mobile application A in the trusted execution environment and mobile application B in the rich execution environment respectively invoke corresponding interfaces provided by a shared security application proxy in the rich execution environment to import respective application keys encrypted and protected using the management server of the shared security application; the shared security application proxy in the rich execution environment sends the imported encrypted application keys (for example, the application key of mobile application A and the application key of mobile application B) to the management server of the shared security application; the management server of the shared security application performs decryption using a private key thereof to obtain the application keys of the mobile applications (for example, the application key of mobile application A and the application key of mobile application B) to be written to the shared security application; the management server of the shared security application delivers the application keys of the mobile applications (for example, the application key of mobile application A and the application key of mobile application B) to the shared security application in the secure element of the mobile terminal; the shared security application securely stores the application keys of the mobile applications (for example, the application key of mobile application A and the application key of mobile application B), wherein the application key of mobile application A and the application key of mobile application B are stored while being isolated from each other, waiting for responding to a service request of the mobile application in the trusted execution environment or a service request of the mobile application in the rich execution environment. In this implementation, mobile application A represents a type of mobile applications in the trusted execution environment, and mobile application B represents a type of mobile applications in the rich execution environment.

Mobile application A in the trusted execution environment or mobile application B in the rich execution environment initiates a service operation request, and mobile application A or mobile application B encrypts, using the communication protection key, service data to be processed using the service key; mobile application A or mobile application B sends the encrypted service data to the shared security application by invoking the interface provided by the shared security application proxy in the rich execution environment; and the shared security application decrypts the service data using the communication security protection key of the corresponding mobile application, then performs processing using the service key, and returns a processing result to mobile application A in the trusted execution environment or mobile application B in the rich execution environment, so as to be used to complete the service flow of mobile application A in the trusted execution environment or mobile application B in the rich execution environment. Compared with the conventional security application authentication, background (server side) docking costs can be avoided when service keys of mobile applications in a trusted execution environment or mobile applications in a rich execution environment are securely downloaded to a shared security application, and a lightweight secure computing solution based on a secure element is provided for mobile applications in the trusted execution environment and mobile applications in the rich execution environment having common secure computing requirements.

Embodiment 4

Figure 8:
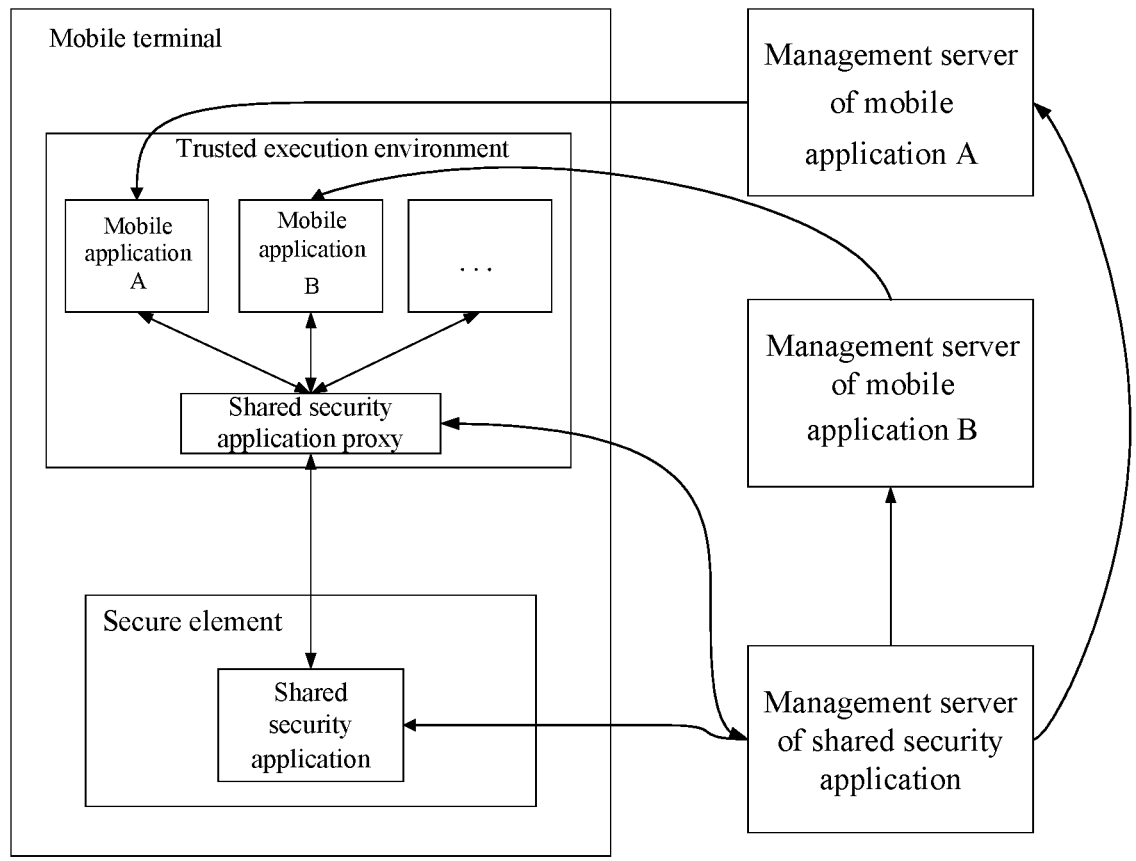
FIG. 8 is a schematic diagram of the key transfer system based on a shared security application in Embodiment 4 of the present specification.

As shown in FIG. 8, the management server of the shared security application distributes a public key thereof to the management server of mobile application A and the management server of mobile application B; the management server of mobile application A generates an application key of mobile application A, the management server of mobile application B generates an application key of mobile application B, and the application keys include communication security protection keys and service keys; the management server of mobile application A and the management server of mobile application B respectively encrypt application keys to be written to the shared security application using a public key of the management server of the shared security application, and deliver the application keys to corresponding mobile applications (for example, mobile application A and mobile application B) in the trusted execution environment of the mobile terminal; the mobile applications (for example, mobile application A and mobile application B) store respective communication security protection keys; the mobile applications in the trusted execution environment invoke corresponding interfaces provided by a shared security application proxy that is also in the trusted execution environment to import respective application keys encrypted and protected using the management server of the shared security application; the shared security application proxy in the trusted execution environment sends the imported encrypted application keys (for example, the application key of mobile application A and the application key of mobile application B) to the management server of the shared security application; the management server of the shared security application performs decryption using a private key thereof to obtain the application keys of the mobile applications (for example, the application key of mobile application A and the application key of mobile application B) to be written to the shared security application; the management server of the shared security application delivers the application keys of the mobile applications (for example, the application key of mobile application A and the application key of mobile application B) to the shared security application in the secure element of the mobile terminal; the shared security application securely stores the application keys of the mobile applications (for example, the application key of mobile application A and the application key of mobile application B), wherein the application key of mobile application A and the application key of mobile application B are stored while being isolated from each other, waiting for responding to service requests of the mobile applications in the trusted execution environment.

Mobile application A or mobile application B in the trusted execution environment initiates a service operation request, and mobile application A or mobile application B encrypts, using the communication protection key, service data to be processed using the service key; mobile application A or mobile application B sends the encrypted service data to the shared security application by invoking the interface provided by the shared security application proxy in the trusted execution environment; and the shared security application decrypts the service data using the communication security protection key of the corresponding mobile application, then performs processing using the service key, and returns a processing result to mobile application A or mobile application B in the trusted execution environment, so as to be used to complete the service flow of mobile application A or mobile application B in the trusted execution environment. Compared with the conventional security application authentication, background (server side) docking costs can be avoided when service keys of mobile applications in a trusted execution environment are securely downloaded to a shared security application, and a lightweight secure computing solution based on a secure element is provided for mobile applications in the trusted execution environment having common secure computing requirements.

Embodiment 5

Figure 9:
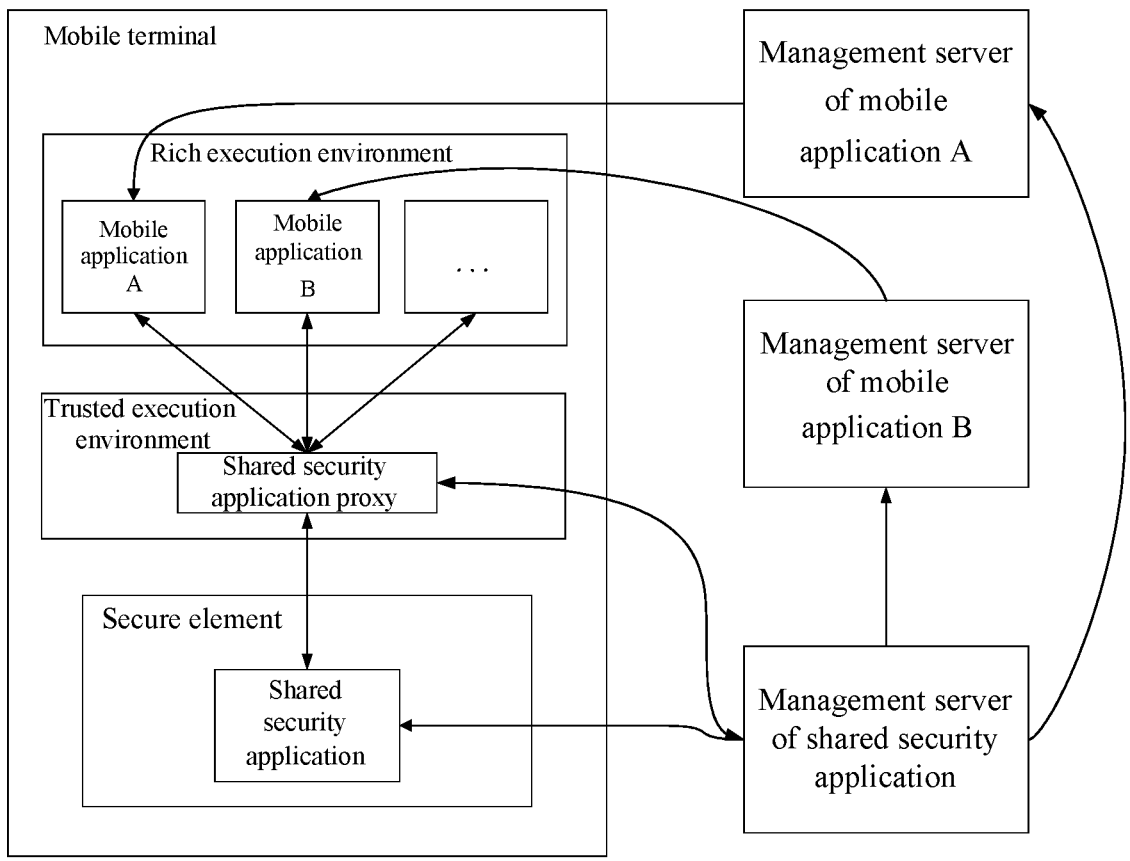
FIG. 9 is a schematic diagram of the key transfer system based on a shared security application in Embodiment 5 of the present specification.

As shown in FIG. 9, the management server of the shared security application distributes a public key thereof to the management server of mobile application A and the management server of mobile application B; the management server of mobile application A generates an application key of mobile application A, the management server of mobile application B generates an application key of mobile application B, and the application keys include communication security protection keys and service keys; the management server of mobile application A and the management server of mobile application B respectively encrypt application keys to be written to the shared security application using a public key of the management server of the shared security application, and deliver the application keys to corresponding mobile applications (for example, mobile application A and mobile application B) in the rich execution environment of the mobile terminal; the mobile applications (for example, mobile application A and mobile application B) in the rich execution environment store respective communication security protection keys; the mobile applications (for example, mobile application A and mobile application B) in the rich execution environment invoke corresponding interfaces provided by a shared security application proxy in the trusted execution environment to import respective application keys encrypted and protected using the management server of the shared security application; the shared security application proxy in the trusted execution environment sends the imported encrypted application keys (for example, the application key of mobile application A and the application key of mobile application B) to the management server of the shared security application; the management server of the shared security application performs decryption using a private key thereof to obtain the application keys of the mobile applications (for example, the application key of mobile application A and the application key of mobile application B) to be written to the shared security application; the management server of the shared security application delivers the application keys of the mobile applications (for example, the application key of mobile application A and the application key of mobile application B) to the shared security application in the secure element of the mobile terminal; the shared security application securely stores the application keys of the mobile applications (for example, the application key of mobile application A and the application key of mobile application B), wherein the application key of mobile application A and the application key of mobile application B are stored while being isolated from each other, waiting for responding to service requests of the mobile applications in the rich execution environment.

Mobile application A or mobile application B in the rich execution environment initiates a service operation request, and mobile application A or mobile application B encrypts, using the communication protection key, service data to be processed using the service key; mobile application A or mobile application B sends the encrypted service data to the shared security application by invoking the interface provided by the shared security application proxy in the trusted execution environment; and the shared security application decrypts the service data using the communication security protection key of the corresponding mobile application, then performs processing using the service key, and returns a processing result to mobile application A or mobile application B in the rich execution environment, so as to be used to complete the service flow of mobile application A or mobile application B in the rich execution environment. Compared with the conventional security application authentication, background (server side) docking costs can be avoided when service keys of mobile applications in a rich execution environment are securely downloaded to a shared security application, and a lightweight secure computing solution based on a secure element is provided for mobile applications in the rich execution environment having common secure computing requirements.

Embodiment 6

Figure 10:
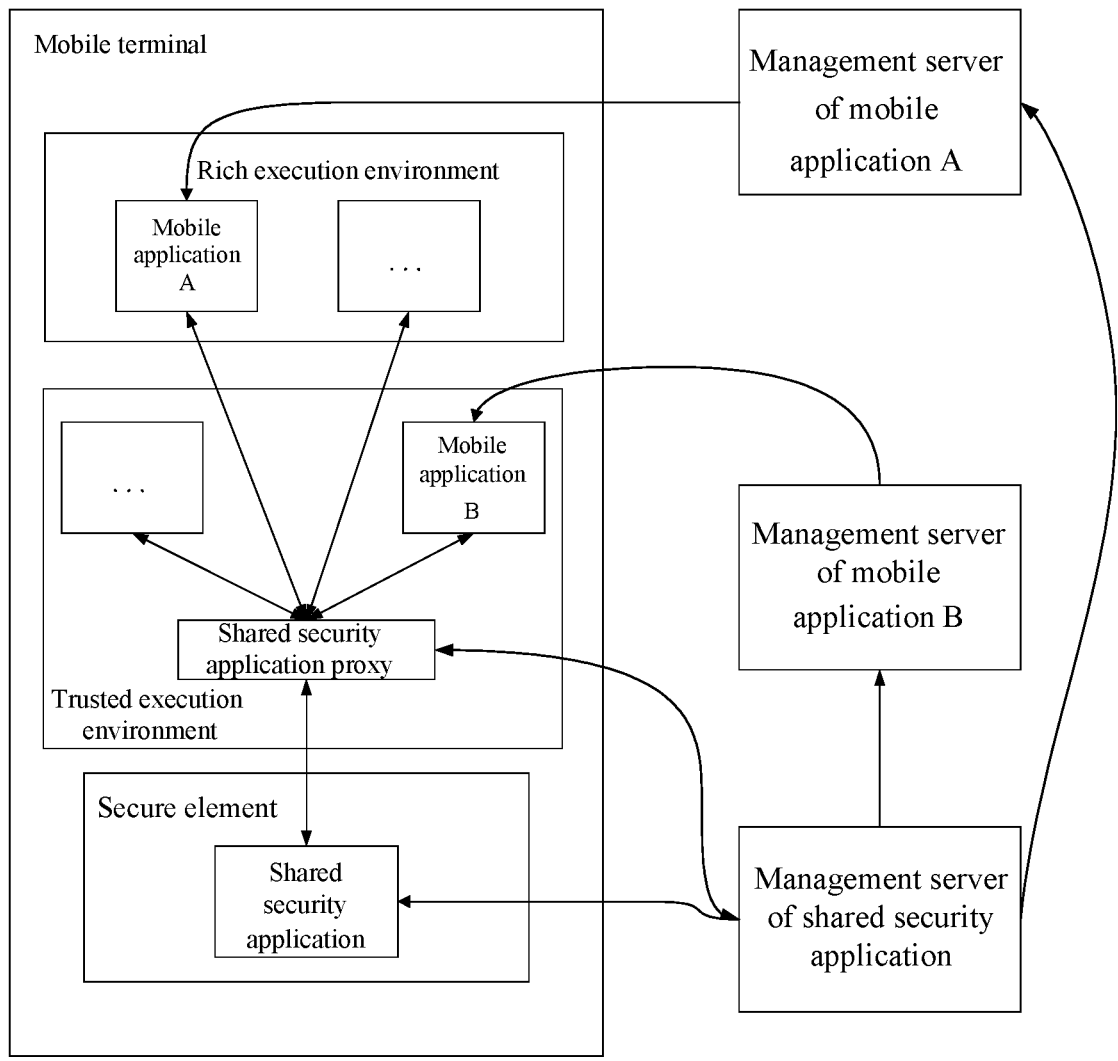
FIG. 10 is a schematic diagram of the key transfer system based on a shared security application in Embodiment 6 of the present specification.

As shown in FIG. 10, the management server of the shared security application distributes a public key thereof to the management server of mobile application A and the management server of mobile application B; the management server of mobile application A generates an application key of mobile application A, the management server of mobile application B generates an application key of mobile application B, and the application keys include communication security protection keys and service keys; the management server of mobile application A and the management server of mobile application B respectively encrypt application keys to be written to the shared security application using a public key of the management server of the shared security application, and deliver the application keys to mobile application A in the rich execution environment of the mobile terminal and mobile application B in the trusted execution environment; mobile application A in the rich execution environment and mobile application B in the trusted execution environment store respective communication security protection keys; mobile application A in the rich execution environment and mobile application B in the trusted execution environment respectively invoke corresponding interfaces provided by a shared security application proxy in the trusted execution environment to import respective application keys encrypted and protected using the management server of the shared security application; the shared security application proxy in the trusted execution environment sends the imported encrypted application keys (for example, the application key of mobile application A and the application key of mobile application B) to the management server of the shared security application; the management server of the shared security application performs decryption using a private key thereof to obtain the application keys of the mobile applications (for example, the application key of mobile application A and the application key of mobile application B) to be written to the shared security application; the management server of the shared security application delivers the application keys of the mobile applications (for example, the application key of mobile application A and the application key of mobile application B) to the shared security application in the secure element of the mobile terminal; the shared security application securely stores the application keys of the mobile applications (for example, the application key of mobile application A and the application key of mobile application B), wherein the application key of mobile application A and the application key of mobile application B are stored while being isolated from each other, respectively waiting for responding to a service request of the mobile application in the rich execution environment or a service request of the mobile application in the trusted execution environment. In this implementation, mobile application A represents a type of mobile applications in the rich execution environment, and mobile application B represents a type of mobile applications in the trusted execution environment.

Mobile application A in the rich execution environment or mobile application B in the trusted execution environment initiates a service operation request, and mobile application A or mobile application B encrypts, using the communication protection key, service data to be processed using the service key; mobile application A or mobile application B sends the encrypted service data to the shared security application by invoking the interface provided by the shared security application proxy in the trusted execution environment; and the shared security application decrypts the service data using the communication security protection key of the corresponding mobile application, then performs processing using the service key, and returns a processing result to mobile application A in the rich execution environment or mobile application B in the trusted execution environment, so as to be used to complete the service flow of mobile application A in the rich execution environment or mobile application B in the trusted execution environment. Compared with the conventional security application authentication, background (server side) docking costs can be avoided when service keys of mobile applications in a rich execution environment or mobile applications in a trusted execution environment are securely downloaded to a shared security application, and a lightweight secure computing solution based on a secure element is provided for mobile applications in the rich execution environment or mobile applications in the trusted execution environment having common secure computing requirements.

Embodiment 7

Figure 11:
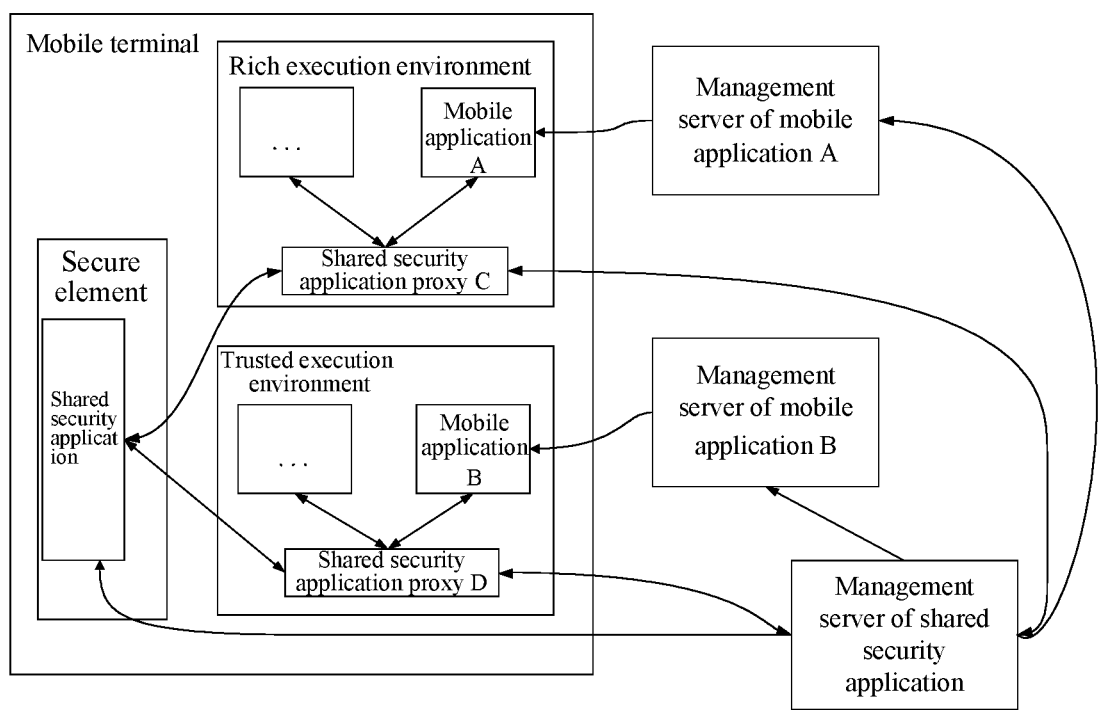
FIG. 11 is a schematic diagram of the key transfer system based on a shared security application in Embodiment 7 of the present specification.

As shown in FIG. 11, the management server of the shared security application distributes a public key thereof to the management server of mobile application A and the management server of mobile application B; the management server of mobile application A generates an application key of mobile application A, the management server of mobile application B generates an application key of mobile application B, and the application keys include communication security protection keys and service keys; the management server of mobile application A and the management server of mobile application B respectively encrypt application keys to be written to the shared security application using a public key of the management server of the shared security application, and deliver the application keys to mobile application A in the rich execution environment of the mobile terminal and mobile application B in the trusted execution environment; mobile application A in the rich execution environment and mobile application B in the trusted execution environment store respective communication security protection keys; mobile application A in the rich execution environment invokes a corresponding interface provided by a shared security application proxy C in the rich execution environment, and mobile application B in the trusted execution environment invokes a corresponding interface provided by a shared security application proxy D in the trusted execution environment, to import respective application keys encrypted and protected using the management server of the shared security application; shared security application proxy C in the rich execution environment and shared security application proxy D in the trusted execution environment respectively send the imported encrypted application keys (for example, the application key of mobile application A and the application key of mobile application B) to the management server of the shared security application; the management server of the shared security application performs decryption using a private key thereof to obtain the application keys of the mobile applications (for example, the application key of mobile application A and the application key of mobile application B) to be written to the shared security application; the management server of the shared security application delivers the application keys of the mobile applications (for example, the application key of mobile application A and the application key of mobile application B) to the shared security application in the secure element of the mobile terminal; the shared security application securely stores the application keys of the mobile applications (for example, the application key of mobile application A and the application key of mobile application B), wherein the application key of mobile application A and the application key of mobile application B are stored while being isolated from each other, waiting for responding to a service request of mobile application A in the rich execution environment or a service request of mobile application B in the trusted execution environment. In this implementation, mobile application A represents a type of mobile applications in the rich execution environment, and mobile application B represents a type of mobile applications in the trusted execution environment.

Mobile application A in the rich execution environment or mobile application B in the trusted execution environment initiates a service operation request, and mobile application A or mobile application B encrypts, using the communication protection key, service data to be processed using the service key; mobile application A sends the encrypted service data to the shared security application by invoking the interface provided by shared security application proxy C in the rich execution environment, mobile application B sends the encrypted service data to the shared security application by invoking the interface provided by shared security application proxy D in the trusted execution environment; and the shared security application decrypts the service data using the communication security protection key of the corresponding mobile application, then performs processing using the service key, and returns a processing result to mobile application A in the rich execution environment or mobile application B in the trusted execution environment, so as to be used to complete the service flow of mobile application A in the rich execution environment or mobile application B in the trusted execution environment. Compared with the conventional security application authentication, background (server side) docking costs can be avoided when service keys of mobile applications in a rich execution environment or mobile applications in a trusted execution environment are securely downloaded to a shared security application through respective shared security application proxies, and a lightweight secure computing solution based on a secure element is provided for mobile applications in the rich execution environment or mobile applications in the trusted execution environment having common secure computing requirements.

An electronic device includes a memory, a processor, and a computer program stored on the memory and executable by the processor, wherein the processor, when executing the program, implements the key transfer method based on a shared security application described above. It should be understood that the electronic device may include a separate mobile terminal or a combination of a mobile terminal and a server side.

A computer-readable storage medium comprises a computer program stored thereon, wherein the computer program, when executed by a processor, implements the key transfer method based on a shared security application described above. It should be understood that the computer program is stored in an individual mobile terminal or a combination of a mobile terminal and a server side.

Figure 12:
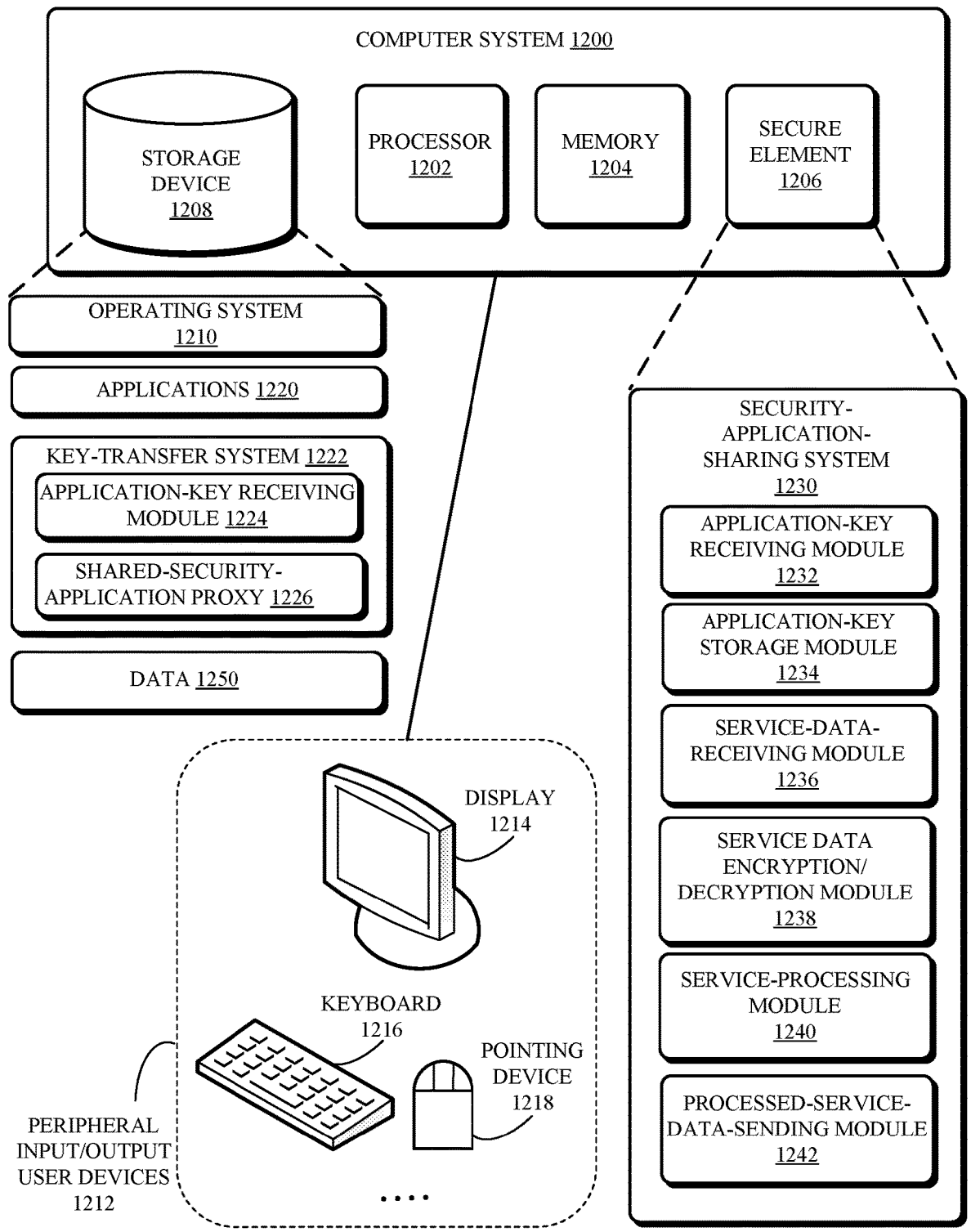
FIG. 12 illustrates an exemplary computer and communication system for transferring keys to facilitate sharing of a security application according to one embodiment.

FIG. 12 illustrates an exemplary computer and communication system for transferring keys to facilitate sharing of a security application according to one embodiment. In FIG. 12, computer system 1200 can include a processor 1202, a memory 1204, a secure element 1206, and a storage device 1208. Furthermore, computer system 1200 can be coupled to peripheral input/output (I/O) user devices 1212, e.g., a display device 1214, a keyboard 1216, and a pointing device 1218. Storage device 1208 can store an operating system 1210, one or more applications 1220, a key-transfer system 1222, and data 1250. Secure element 1206 can store a security-application-sharing system 1230.

Applications 1220 can include instructions, which can be loaded from storage device 1208 into memory 1204 and executed by processor 1202. As a result, computer system 1200 can perform specific functions provided by applications 1220. In some embodiments, processor 1202 can include a trusted execution environment and/or a rich execution environment such that applications 1220 can be executed in the trusted execution environment and/or the rich execution environment.

Key-transfer system 1222 can include instructions, which when executed by computer system 1200, can cause computer system 1200 or processor 1202 to perform methods and/or processes described in this disclosure. Specifically, key-transfer system 1222 can include instructions for a receiving application keys from application servers (key-receiving module 1224). Those applications can be encrypted using encryption keys provided by the management server of a shared security application. Key-transfer system 1222 can include instructions for providing an interface between applications and the shared security application (shared-security-application proxy 1226). More specifically, applications can invoke application keys securely stored in the security application via the interface provided by shared-security-application proxy 1226.

Security-application-sharing system 1230 can include instructions, which when executed by computer system 1200, can cause computer system 1200 or secure element 1206 to perform methods and/or processes described in this disclosure. Specifically, security-application-sharing system 1230 can include instructions for receiving application keys from the management server of the shared security application (application-key-receiving module 1232) and instructions for storing the application keys (application-key-storage module 1234). Note that these application keys can be generated by management servers of the applications and forwarded by the applications to the management server of the shared security application. While storing these application keys, application-key-storage module 1234 securely isolates application keys of different applications.

Security-application-sharing system 1230 can further include instructions for receiving service data from applications, such as applications 1220 (service-data-receiving module 1236), instructions for encrypting and decrypting service data (service data encryption/decryption module 1238), instructions for processing services based on the corresponding application keys (service-processing module 1240), and instructions for sending processed service data back to applications, such as applications 1220 (processed-service-data-sending module 1242).

In some embodiments, applications 1220 and the various modules in key-transfer system 1222 and security-application-sharing system 1230, such as modules 1224, 1226, and 1232-1242 can be partially or entirely implemented in hardware. Further, in some embodiments, the system may not include a separate processor and memory. Instead, in addition to performing their specific tasks, modules 1220, 1224, 1226, and 1232-1242, either separately or in concert, may be part of general- or special-purpose computation engines.

Figure 13:
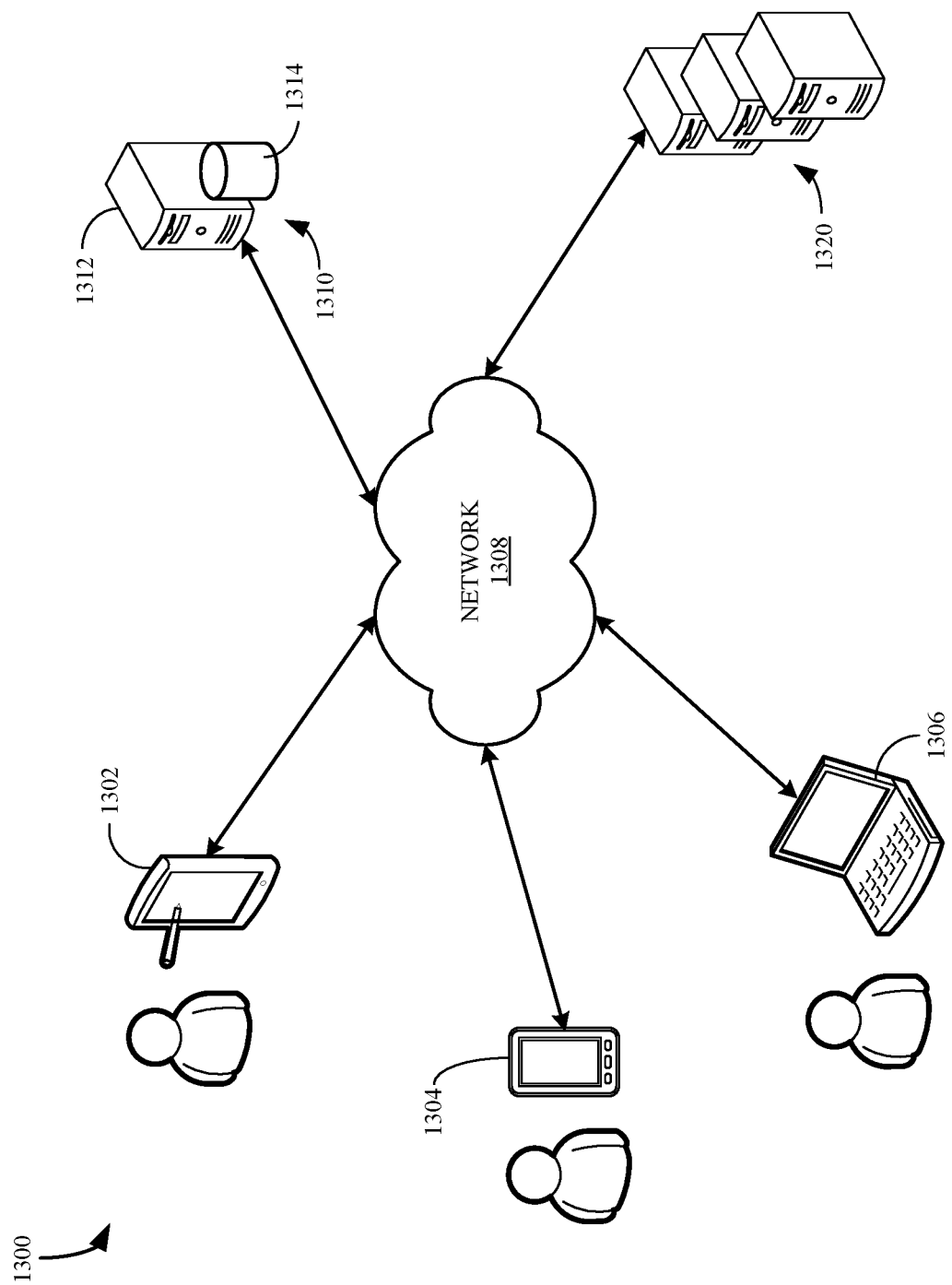
FIG. 13 illustrates an exemplary network environment for implementing the disclosed technology, in accordance with some embodiments described herein.

FIG. 13 illustrates an exemplary network environment for implementing the disclosed technology, in accordance with some embodiments described herein. A network environment 1300 includes a number of electronic devices 1302, 1304 and 1306 communicably connected to a server 1310 by a network 1308. One or more remote servers 1320 are further coupled to the server 1310 and/or the one or more electronic devices 1302, 1304 and 1306.

In some exemplary embodiments, electronic devices 1302, 1304 and 1306 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 1302, 1304 and 1306 store a user agent such as a browser or application. In the example of FIG. 13, electronic device 1302 is depicted as a tablet computer, electronic device 1304 is depicted as a smartphone, and electronic device 1306 is depicted as a laptop computer.

Server 1310 includes a processing device 1312 and a data store 1314. Processing device 1312 executes computer instructions stored in data store 1314, for example, to assist in scheduling a customer-initiated service or a service-provider-initiated service between a service provider and a customer at electronic devices 1302, 1304 and 1306 during a service scheduling process.

In some exemplary aspects, server 1310 can be a single computing device such as a computer server. In other embodiments, server 1310 can represent more than one computing device working together to perform the actions of a server computer (e.g., cloud computing). The server 1310 may host the web server communicably coupled to the browser at the client device (e.g., electronic devices 1302, 1304 or 1306) via network 1308. In one example, the server 1310 may host a client application for scheduling a customer-initiated service or a service-provider-initiated service between a service provider and a customer during a service scheduling process. Server 1310 may further be in communication with one or more remote servers 1320 either through the network 1308 or through another network or communication means.

The one or more remote servers 1320 may perform various functionalities and/or storage capabilities described herein with regard to the server 1310, either alone or in combination with server 1310. Each of the one or more remote servers 1320 may host various services. For example, servers 1320 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 1320 can be a single computing device such as a computer server or can represent more than one computing device working together to perform the actions of a server computer (e.g., cloud computing). In one embodiment server 1310 and one or more remote servers 1320 may be implemented as a single server or a cluster of servers. In one example, server 1310 and one or more remote servers 1320 may communicate through the user agent at the client device (e.g., electronic devices 1302, 1304 or 1306) via network 1308.

Users may interact with the system hosted by server 1310, and/or one or more services hosted by remote servers 1320, through a client application installed at the electronic devices 1302, 1304, and 1306. Alternatively, the user may interact with the system through a web-based browser application at the electronic devices 1302, 1304, and 1306. Communication among client devices 1302, 1304, 1306 and the system, and/or one or more services, may be facilitated through a network (e.g., network 1308).

Communication among the client devices 1302, 1304, 1306, server 1310 and/or one or more remote servers 1320 may be facilitated through various communication protocols. In some aspects, client devices 1302, 1304, 1306, server 1310 and/or one or more remote servers 1320 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 1308 can include, for example, any one or more of a personal area network (PAN), a local area network (LAN), a campus area network (CAN), a metropolitan area network (MAN), a wide area network (WAN), a broadband network (BBN), the Internet, and the like. Further, network 1308 can include, but is not limited to, any one or more of the following network topologies, including a bus network, a star network, a ring network, a mesh network, a star-bus network, a tree or hierarchical network, and the like.

One or a plurality of embodiments of the present specification provide a key transfer method based on a shared security application, wherein a shared security application placed in a secure element stores application keys invoked by a plurality of mobile applications, and meanwhile, the shared security application provides security isolation protection for an independent and dedicated application key of each mobile application. The one or plurality of embodiments of the present specification further relate to a key transfer system based on a shared security application, an electronic device, and a storage medium. The one or plurality of embodiments of the present specification provide a novel security application solution architecture, especially for mobile applications having common secure computing requirements, the one or plurality of embodiments of the present specification employ a lightweight secure computing solution based on a secure element, so that background docking costs can be avoided when service keys of different applications are securely downloaded to a shared security application; meanwhile, communication security protection keys are combined with service keys, so that flow processing on the service level can be implemented through the service keys while secure communication between mobile applications and the shared security application can be implemented through the communication security protection keys. Especially for mobile applications that need to realize simple and universal secure computing requirements through a secure element, it is unnecessary to independently develop an application software development kit and download, install, and personalize the kit to the secure element, thereby greatly reducing the costs of secure computing performed by the mobile applications using the secure element.

The specific embodiments of the present specification have been described above. Other embodiments fall within the scope of the appended claims. In some cases, the actions or steps recited in the claims may be performed in a sequence different from the order in the embodiments and may still achieve the desired result. Further, the processes depicted in the drawings do not necessarily require the particular order or sequential order shown to achieve the desired result. In certain implementations, multitasking and parallel processing are also possible or may be advantageous.

The embodiments in the present specification are described in a progressive manner, and for identical or similar parts between different embodiments, reference may be made to each other so that each of the embodiments focuses on differences from other embodiments. In particular, since the apparatus, electronic device, and non-volatile computer storage medium embodiments are basically similar to the method embodiments, the description thereof is relatively brief. For related parts, reference may be made to part of the description of the method embodiments.

The apparatus, the electronic device, and the non-volatile computer storage medium provided in the embodiments of the present specification correspond to the method. Therefore, the apparatus, the electronic device, and the non-volatile computer storage medium also have beneficial technical effects similar to those of the corresponding method. As the beneficial technical effects of the method have been illustrated in detail previously, the beneficial technical effects of the corresponding apparatus, electronic device, and non-volatile computer storage medium will not be described herein again.

In the 1990s, whether a technical improvement is a hardware improvement (for example, an improvement on a circuit structure such as a diode, a transistor, or a switch) or a software improvement (an improvement on a method procedure) can be differentiated clearly. However, along with the development of technologies, many improvements on method procedures nowadays can be regarded as direct improvements on hardware circuit structures. Almost all the designers program an improved method procedure into a hardware circuit to obtain a corresponding hardware circuit structure. Therefore, it cannot be said that an improvement on a method procedure cannot be implemented by a hardware entity module. For example, a programmable logic device (PLD) (for example, a field programmable gate array (FPGA)) is such an integrated circuit, and a logical function of the PLD is determined by a user through device programming. The designers may program by themselves to "integrate" a digital system with a PLD, and there is no need to ask a chip manufacturer to design and manufacture an application specific integrated circuit chip. Furthermore, instead of manually manufacturing an integrated circuit chip, such programming is often implemented by "logic compiler" software, which is similar to a software compiler used in program development and writing. Original code before compiling also needs to be written in a particular programming language, which is referred to as a hardware description language (HDL). There is not just one, but many types of HDLs, for example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog are most commonly used nowadays. Those skilled in the art should also understand that a hardware circuit for implementing a logic method procedure may be easily obtained only by slightly logically programming the method procedure using the above several hardware description languages and programming the method procedure into an integrated circuit.

A controller may be implemented in any suitable manner. For example, the controller may be in the form of a microprocessor or processor and a computer-readable medium that stores computer-readable program code (for example, software or firmware) executable by the (micro) processor, logic gates, switches, an application specific integrated circuit (ASIC), a programmable logic controller, and an embedded microcontroller. The examples of the controller include, but are not limited to the following microcontrollers: ARC 625D, Atmel AT91SAM, Microchip PIC18F26K20, and Silicone Labs C8051F320. The memory controller may also be implemented as part of the control logic of the memory. Those skilled in the art also know that, in addition to implementing a controller by pure computer-readable program code, with a logic programming of method or steps, the controller may implement the same function in the form of a logic gate, a switch, an application specific integrated circuit, a programmable logic controller, an embedded microcontroller, or the like. Therefore, such a controller may be regarded as a hardware component, and an apparatus included therein for implementing various functions may be regarded as an internal structure of the hardware component. Or, the apparatus for implementing various functions can even be regarded as both a software module for implementing a method and a structure in a hardware component.

The system, apparatus, module, or unit illustrated in the aforementioned embodiments may be specifically implemented by a computer chip or an entity, or a product having a certain function. A typical implementation device is a computer. Specifically, the computer may be, for example, a personal computer, a laptop computer, a cell phone, a camera phone, a smart phone, a personal digital assistant, a media player, a navigation device, an email device, a game console, a tablet computer, a wearable device, or a combination of any of these devices.

For the sake of convenient description, the above apparatus is functionally divided into various units which are separately described. Certainly, during implementation of one or a plurality of embodiments of the present specification, the functions of various units may be implemented in one or a plurality of instances of software and/or hardware.

Those skilled in the art should understand that the embodiments of the present specification may be provided as a method, a system, or a computer program product. Therefore, the embodiments of the present specification may be in the form of a full hardware embodiment, a full software embodiment, or an embodiment combining software and hardware aspects. Moreover, the embodiments of the present specification may be in the form of a computer program product implemented on one or a plurality of computer-usable storage media (including, but not limited to, a magnetic disk memory, a CD-ROM, an optical memory, and so on) containing computer-usable program code therein.

The present specification is described with reference to the flowcharts and/or block diagrams of the method, the device (system), and the computer program product according to the embodiments of the present specification. It should be understood that each flow and/or block in the flowcharts and/or block diagrams and a combination of the flows and/or blocks in the flowcharts and/or block diagrams may be implemented by computer program instructions. These computer program instructions may be provided to a processor of a general-purpose computer, a special-purpose computer, an embedded processor, or any other programmable data processing device to produce a machine, so that instructions executed by the processor of the computer or other programmable data processing device generate an apparatus for implementing a specified function in one or a plurality of procedures in the flowcharts and/or one or a plurality of blocks in the block diagrams.

These computer program instructions may also be stored in a computer-readable memory that can direct a computer or any other programmable data processing device to operate in a particular manner, so that the instructions stored in the computer-readable memory produce an article of manufacture including an instruction apparatus, the instruction apparatus implementing a specified function in one or a plurality of procedures in the flowcharts and/or one or a plurality of blocks in the block diagrams.

These computer program instructions may also be loaded onto a computer or any other programmable data processing device so that a series of operational steps are performed on the computer or other programmable device to produce computer-implemented processing, and thus the instructions executed on the computer or other programmable device provide the steps for implementing a specified function in one or a plurality of procedures in the flowcharts and/or one or a plurality of blocks in the block diagrams.

In a typical configuration, the computing device includes one or a plurality of processors (CPUs), input/output interfaces, network interfaces, and memories.

The memory may include a computer-readable medium in the form of a non-permanent memory, a random access memory (RAM) and/or a non-volatile memory or the like, such as a read-only memory (ROM) or a flash memory (flash RAM). The memory is an example of a computer-readable medium.

The computer-readable medium includes permanent and non-permanent, movable and non-movable media that can achieve information storage by means of any methods or techniques. The information may be computer-readable instructions, data structures, modules of programs or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EE-PROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable medium does not include transitory computer-readable media (transitory media), such as a modulated data signal and a carrier wave.

It should further be noted that the term "include," "comprise," or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. In the absence of more restrictions, the element defined by the statement "including one . . . " does not exclude other identical elements in the process, method, commodity or device that includes the element.

The present specification may be described in a general context of computer-executable instructions executed by a computer, such as a program module. Typically, the program modules include routines, programs, objects, components, data structures, and the like that execute specific tasks or implement specific abstract data types. The present specification may also be implemented in distributed computing environments. In the distributed computing environments, tasks are executed by remote processing devices that are connected by a communication network. In a distributed computing environment, the program module may be located in local and remote computer storage media including storage devices.

The embodiments in the present specification are described in a progressive manner, and for identical or similar parts between different embodiments, reference may be made to each other so that each of the embodiments focuses on differences from other embodiments. Especially, the system embodiment is described relatively briefly because it is substantially similar to the method embodiments, and for related parts, reference may be made to the method embodiments.

The above descriptions are merely the embodiments of the present specification, and are not intended to limit one or a plurality of embodiments of the present specification. For those skilled in the art, one or a plurality of embodiments of the present specification may have various alterations and changes. Any modifications, equivalent substitutions, improvements and the like made within the spirit and the principle of the one or plurality of embodiments of the present specification shall fall within the scope of the claims of the one or plurality of embodiments of the present specification.

What is claimed is:

1. A computer executed method, comprising:
   receiving, by an application executing on a terminal device, an application key comprising at least a service key from a management server of the application;
   forwarding the application key to a management server of a shared security application residing in a secure element in the terminal device, thereby facilitating the management server of the shared security application to deliver the application key to the shared security application; and
   invoking, by the application, the application key stored in the shared security application to perform services associated with the application, wherein the application key is isolated from other application keys associated with other applications stored in the shared security application.

2. The method according to claim 1, wherein the application key further comprises a communication security protection key, and wherein the method further comprises:
   encrypting, by the application, service data associated with the services using the communication security protection key; and
   sending the encrypted service data to the shared security application.

3. The method according to claim 2, further comprising:
   decrypting, by the shared security application, the encrypted service data;
   processing, by the shared security application, the service data using the service key;
   encrypting, by the shared security application, the processed service data using the communication security protection key; and
   returning, by the shared security application, the encrypted processed service data to the application.

4. The method according to claim 1, wherein receiving the application key from the management server of the application comprises receiving the application key that is encrypted by the management server of the application using a public key of the management server of the shared security application, and wherein the public key of the management server of the shared security application is distributed to the management server of the application by the management server of the shared security application.

5. The method according to claim 4, wherein forwarding the application key comprises:
   invoking, by the application, a corresponding interface provided by a shared security application proxy on the terminal device external of the secure element;
   sending, by the application via the corresponding interface and the security application proxy, the encrypted application key to the management server of the shared security application;
   performing, by the management server of the shared security application, decryption using a private key corresponding to the public key to obtain the application key; and
   delivering, by the management server of the shared security application, the application key to the shared security application in the secure element.

6. The method according to claim 5, wherein the shared security application proxy is executed in a rich execution environment or a trusted execution environment of the terminal device.

7. The method according to claim 5, wherein the public key and the private key of the management server of the shared security application form an asymmetric key pair, and wherein an encryption or decryption operation based on the asymmetric key pair comprises one of the following operations: Rivest-Shamir-Adleman (RSA), Elgamal, knapsack, Rabin, Diffie-Hellman (D-H), and elliptic-curve cryptography (ECC).

8. The method according to claim 1, wherein the application is executed in a rich execution environment or a trusted execution environment of the terminal device.

9. A computer system, comprising:
a processer;
a storage device coupled to the processor and storing instructions, which when executed by the processor cause the processor to perform a method, the method comprising:
receiving, by an application executing on a terminal device, an application key comprising at least a service key from a management server of the application;
forwarding the application key to a management server of a shared security application residing in a secure element in the terminal device, thereby facilitating the management server of the shared security application to deliver the application key to the shared security application; and
invoking, by the application, the application key stored in the shared security application to perform services associated with the application, wherein the application key is isolated from other application keys associated with other applications stored in the shared security application.

10. The computer system according to claim 9, wherein the application key further comprises a communication security protection key, and wherein the method further comprises:
encrypting, by the application, service data associated with the services using the communication security protection key; and
sending the encrypted service data to the shared security application.

11. The computer system according to claim 10, wherein the method further comprises:
decrypting, by the shared security application, the encrypted service data;
processing, by the shared security application, the service data using the service key;
encrypting, by the shared security application, the processed service data using the communication security protection key; and
returning, by the shared security application, the encrypted processed service data to the application.

12. The computer system according to claim 9, wherein receiving the application key from the management server of the application comprises receiving the application key that is encrypted by the management server of the application using a public key of the management server of the shared security application, and wherein the public key of the management server of the shared security application is distributed to the management server of the application by the management server of the shared security application.

13. The computer system according to claim 12, wherein forwarding the application key comprises:
invoking, by the application, a corresponding interface provided by a shared security application proxy on the terminal device external of the secure element;
sending, by the application via the corresponding interface and the security application proxy, the encrypted application key to the management server of the shared security application;
performing, by the management server of the shared security application, decryption using a private key corresponding to the public key to obtain the application key; and
delivering, by the management server of the shared security application, the application key to the shared security application in the secure element.

14. The computer system according to claim 13, wherein the shared security application proxy is executed in a rich execution environment or a trusted execution environment of the terminal device.

15. The computer system according to claim 13, wherein the public key and the private key of the management server of the shared security application form an asymmetric key pair, and wherein an encryption or decryption operation based on the asymmetric key pair comprises one of the following operations: Rivest-Shamir-Adleman (RSA), Elgamal, knapsack, Rabin, Diffie-Hellman (D-H), and elliptic-curve cryptography (ECC).

16. The computer system according to claim 9, wherein the application is executed in a rich execution environment or a trusted execution environment of the terminal device.

17. A non-transitory computer-readable storage medium storing instructions that when executed by a computer cause the computer to perform a method, the method comprising:
receiving, by an application executing on a terminal device, an application key comprising at least a service key from a management server of the application;
forwarding the application key to a management server of a shared security application residing in a secure element in the terminal device, thereby facilitating the management server of the shared security application to deliver the application key to the shared security application; and
invoking, by the application, the application key stored in the shared security application to perform services associated with the application, wherein the application key is isolated from other application keys associated with other applications stored in the shared security application.

18. The non-transitory computer-readable storage medium according to claim 17, wherein the application key further comprises a communication security protection key, and wherein the method further comprises:
encrypting, by the application, service data associated with the services using the communication security protection key; and
sending the encrypted service data to the shared security application.

19. The non-transitory computer-readable storage medium according to claim 18, wherein the method further comprises:
decrypting, by the shared security application, the encrypted service data;
processing, by the shared security application, the service data using the service key;

encrypting, by the shared security application, the processed service data using the communication security protection key; and returning, by the shared security application, the encrypted processed service data to the application.

20. The non-transitory computer-readable storage medium according to claim 17, wherein receiving the application key from the management server of the application comprises receiving the application key that is encrypted by the management server of the application using a public key of the management server of the shared security application, and wherein the public key of the management server of the shared security application is distributed to the management server of the application by the management server of the shared security application.

21. The non-transitory computer-readable storage medium according to claim 20, wherein forwarding the application key comprises:

invoking, by the application, a corresponding interface provided by a shared security application proxy on the terminal device external of the secure element;

sending, by the application via the corresponding interface and the security application proxy, the encrypted application key to the management server of the shared security application;

performing, by the management server of the shared security application, decryption using a private key corresponding to the public key to obtain the application key; and delivering, by the management server of the shared security application, the application key to the shared security application in the secure element.

22. The non-transitory computer-readable storage medium according to claim 21, wherein the shared security application proxy is executed in a rich execution environment or a trusted execution environment of the terminal device.

23. The non-transitory computer-readable storage medium according to claim 21, wherein the public key and the private key of the management server of the shared security application form an asymmetric key pair, and wherein an encryption or decryption operation based on the asymmetric key pair comprises one of the following operations: Rivest-Shamir-Adleman (RSA), Elgamal, knapsack, Rabin, Diffie-Hellman (D-H), and elliptic-curve cryptography (ECC).

24. The non-transitory computer-readable storage medium according to claim 17, wherein the application is executed in a rich execution environment or a trusted execution environment of the terminal device.

\* \* \* \* \*